US012335470B2

(12) United States Patent
Sarwer et al.

(10) Patent No.: US 12,335,470 B2
(45) Date of Patent: Jun. 17, 2025

(54) DIRECTIONAL CROSS COMPONENT FILTER FOR VIDEO CODING

(71) Applicant: ALIBABA GROUP HOLDING LIMITED, George Town (KY)

(72) Inventors: Mohammed Golam Sarwer, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 71 days.

(21) Appl. No.: 17/650,576

(22) Filed: Feb. 10, 2022

(65) Prior Publication Data

US 2022/0279176 A1 Sep. 1, 2022

Related U.S. Application Data

(60) Provisional application No. 63/154,582, filed on Feb. 26, 2021.

(51) Int. Cl.

| | |
|---|---|
| ***H04N 19/117*** | (2014.01) |
| ***H04N 19/176*** | (2014.01) |
| ***H04N 19/196*** | (2014.01) |
| ***H04N 19/436*** | (2014.01) |

(52) U.S. Cl.
CPC ......... *H04N 19/117* (2014.11); *H04N 19/176* (2014.11); *H04N 19/196* (2014.11); *H04N 19/436* (2014.11)

(58) Field of Classification Search
CPC .. H04N 19/117; H04N 19/176; H04N 19/196; H04N 19/436
See application file for complete search history.

(56) References Cited

U.S. PATENT DOCUMENTS

2012/0321205 A1* 12/2012 Lai ...................... H04N 19/176 382/233
2021/0266604 A1* 8/2021 Du ...................... H04N 19/117
2021/0368169 A1* 11/2021 Hu ...................... H04N 19/80
2022/0182641 A1* 6/2022 Nam ...................... H04N 19/82
2022/0264106 A1* 8/2022 Zhang ...................... H04N 19/82
2022/0303530 A1* 9/2022 Du ...................... H04N 19/593

FOREIGN PATENT DOCUMENTS

JP 2013534119 A * 8/2013

OTHER PUBLICATIONS

AV1 codec, https://en.wikipedia.org/wiki/AV1, 30 pages.
(Continued)

*Primary Examiner* — Dave Czekaj
*Assistant Examiner* — Shanika M Brumfield
(74) *Attorney, Agent, or Firm* — Finnegan, Henderson, Farabow, Garrett & Dunner, LLP

(57) ABSTRACT

A directional cross component filter may be used in a video decoding method. The video decoding method includes: determining a direction of a reconstructed luma block; decoding an encoded bit stream to determine a plurality of filter coefficients associated with a directional cross component filter; and applying the plurality of filter coefficients to the reconstructed luma block to determine an offset to the direction of the reconstructed luma block.

22 Claims, 40 Drawing Sheets

(56) References Cited

OTHER PUBLICATIONS

Chen et al., "An Overview of Core Coding Tools in the AV1 Video Codec," 2018 Picture Coding Symposium (PCS), San Francisco, CA, 2018, pp. 41-45.
Midtskogen et al., "The AV1 Constrained Directional Enhancement Filter (CDEF)", Oct. 2017, https:/arxiv.org/pdf/1602.05975.pdf.
Montgomery, "AV1: next generation video—The Constrained Directional Enhancement Filter", Jun. 2018, https://hacks.mozilla.org/2018/06/av1-next-generation-video-the-constrained-directional-enhancement-filter/.
Rivaz, et al., "AV1 Bitstream & Decoding Process Specification," https://aomediacodec.github.io/av1-spec/av1-spec.pdf, 681 pages.

* cited by examiner (c) Cr (b) Cb (a) Y

Table 1: Neighboring position of 9-tap cross shape filter

| Neighbor (n) | Neighboring position of (i, j) of 9 tap filter shown in **FIG. 16** |
|---|---|
| 0 | *i-2, j* |
| 1 | *i-1, j* |
| 2 | *i, j-2* |
| 3 | *i, j-1* |
| 4 | *i, j+1* |
| 5 | *i, J+2* |
| 6 | *i+1, j* |
| 7 | *i + 2, j* |

FIG. 19

Table 2: Sequence header syntax of the proposed method

| sequence_header_obu( ) { | **Type** |
|---|---|
| **seq_profile** | f(3) |
| **still_picture** | f(1) |
| .... | |
| **reduced_still_picture_header** | f(1) |
| **enable_superres** | f(1) |
| **enable_cdef** | f(1) |
| **enable_restoration** | f(1) |
| color_config( ) | |
| 2001 if (NumPlanes > 1) | |
| **enable_cccdef** | f(1) |
| **film_grain_params_present** | f(1) |
| } | |

FIG. 20

Table 3: Sequence header syntax of the proposed method

| sequence_header_obu( ) { | **Type** |
|---|---|
| **seq_profile** | f(3) |
| **still_picture** | f(1) |
| …. | |
| **reduced_still_picture_header** | f(1) |
| **enable_superres** | f(1) |
| **enable_cdef** | f(1) |
| **enable_restoration** | f(1) |
| color_config( ) | |
| if (enable_cdef && NumPlanes > 1) | |
| **enable_cccdef** | f(1) |
| **film_grain_params_present** | f(1) |
| } | |

Table 4: Proposed syntax table of frame header

| cdef_params( ) { | **Type** |
|---|---|
| if ( CodedLossless \|\| allow_intrabc \|\| | |
| !enable_cdef) { | |
| cdef_bits = 0 | |
| cdef_y_pri_strength[0] = 0 | |
| cdef_y_sec_strength[0] = 0 | |
| cdef_uv_pri_strength[0] = 0 | |
| cdef_uv_sec_strength[0] = 0 | |
| CdefDamping = 3 | |
| return | |
| } | |
| **cdef_damping_minus_3** | f(2) |
| CdefDamping = cdef_damping_minus_3 + 3 | |
| **cdef_bits** | f(2) |
| for ( i = 0; i < (1 << cdef_bits); i++ ) { | |
| **cdef_y_pri_strength[i]** | f(4) |
| **cdef_y_sec_strength[i]** | f(2) |
| if ( cdef_y_sec_strength[i] == 3 ) | |
| cdef_y_sec_strength[i] += 1 | |
| if ( NumPlanes > 1 ) { | |
| **cdef_uv_pri_strength[i]** | f(4) |
| **cdef_uv_sec_strength[i]** | f(2) |
| if ( cdef_uv_sec_strength[i] == 3 ) | |
| cdef_uv_sec_strength[i] += 1 | |
| } | |
| } | |

FIG. 23

Table 4 (continued): Proposed syntax table of frame header

2301

| | |
|---|---|
| if (enable_cccdef) { | |
| for ( i = 0; i < 2; i++ ) { | |
| **cccdef_frame_enable_flag[i]** | f(1) |
| if (cccdef_frame_enable_flag[i] ) { | |
| **cccdef_new_filter_flag[i]** | f(1) |
| if (cccdef_new_filter_flag[i] ) { | |
| for ( d = 0; d< 8; d++ ) { | |
| for ( n = 0; n< 8; n++ ) { | |
| **cccdef_filter_coeff_abs[i][d][n]** | f( coeffBits) |
| if(cccdef_filter_coeff_abs[i][d][n]) | |
| **cccdef_filter_coeff_sign[i][d][n]** | f(1) |
| } | |
| } | |
| } | |
| else { | |
| **cccdef_filter_set_idx[i]** | f( indexBits) |
| } | |
| } | |
| } | |
| } | |
| | |
| } | |

FIG. 23 (Continued)

Table 5: Proposed syntax table of frame header

| cdef_params( ) { | **Type** |
|---|---|
| if ( CodedLossless \|\| allow_intrabc \|\| | |
| !enable_cdef) { | |
| cdef_bits = 0 | |
| cdef_y_pri_strength[0] = 0 | |
| cdef_y_sec_strength[0] = 0 | |
| cdef_uv_pri_strength[0] = 0 | |
| cdef_uv_sec_strength[0] = 0 | |
| CdefDamping = 3 | |
| return | |
| } | |
| **cdef_damping_minus_3** | f(2) |
| CdefDamping = cdef_damping_minus_3 + 3 | |
| **cdef_bits** | f(2) |
| for ( i = 0; i < (1 << cdef_bits); i++ ) { | |
| **cdef_y_pri_strength[i]** | f(4) |
| **cdef_y_sec_strength[i]** | f(2) |
| if ( cdef_y_sec_strength[i] == 3 ) | |
| cdef_y_sec_strength[i] += 1 | |
| if ( NumPlanes > 1 ) { | |
| **cdef_uv_pri_strength[i]** | f(4) |
| **cdef_uv_sec_strength[i]** | f(2) |
| if ( cdef_uv_sec_strength[i] == 3 ) | |
| cdef_uv_sec_strength[i] += 1 | |
| } | |
| } | |

FIG. 25

Table 5 (continued): Proposed syntax table of frame header

2501

| | |
|---|---|
| if (enable_cccdef) { | |
| for ( i = 0; i < 2; i++ ) { | |
| **ccdef_frame_enable_flag[i]** | f(1) |
| if (cccdef_frame_enable_flag[i] ) { | |
| for ( d = 0; d< 8; d++ ) { | |
| **cccdef_direction_enable_flag[i][d]** | f(1) |
| if (cccdef_direction_enable_flag[i][d] ) { | |
| **cccdef_new_filter_flag[i][d]** | f(1) |
| if (cccdef_new_filter_flag[i] ) { | |
| for ( n = 0; n< 8; n++ ) { | |
| **cccdef_filter_coeff_abs[i][d][n]** | f(coeffBits$_d$) |
| if(cccdef_filter_coeff_abs[i][d][n]) | |
| **cccdef_filter_coeff_sign[i][d][n]** | f(1) |
| } | |
| } | |
| else { | |
| cccdef_filter_set_idx[i][d] | f(indexBits$_d$) |
| } | |
| } # direction enable flag | |
| } # for each direction | |
| } # frame enable flag | |
| } # for i = 0 to 1 | |
| } | |
| } | |

FIG. 25
(Continued)

Table 6: Syntax table with proposed history buffer initialize flag

| cdef_params( ) { | **Type** |
|---|---|
| if ( CodedLossless \|\| allow_intrabc \|\| | |
| !enable_cdef) { | |
| cdef_bits = 0 | |
| cdef_y_pri_strength[0] = 0 | |
| cdef_y_sec_strength[0] = 0 | |
| cdef_uv_pri_strength[0] = 0 | |
| cdef_uv_sec_strength[0] = 0 | |
| CdefDamping = 3 | |
| return | |
| } | |
| **cdef_damping_minus_3** | f(2) |
| CdefDamping = cdef_damping_minus_3 + 3 | |
| **cdef_bits** | f(2) |
| for ( i = 0; i < (1 << cdef_bits); i++ ) { | |
| **cdef_y_pri_strength[i]** | f(4) |
| **cdef_y_sec_strength[i]** | f(2) |
| if ( cdef_y_sec_strength[i] == 3 ) | |
| cdef_y_sec_strength[i] += 1 | |
| if ( NumPlanes > 1 ) { | |
| **cdef_uv_pri_strength[i]** | f(4) |
| **cdef_uv_sec_strength[i]** | f(2) |
| if ( cdef_uv_sec_strength[i] == 3 ) | |
| cdef_uv_sec_strength[i] += 1 | |
| } | |
| } | |

FIG. 26

Table 6 (continued): Syntax table with proposed history buffer initialize flag

2601

| | |
|---|---|
| if (enable_cccdef) { | |
| **ccdef_history_buffer_initialize_flag** | **f(1)** |
| for ( i = 0; i < 2; i++ ) { | |
| **ccdef_frame_enable_flag[i]** | f(1) |
| if (cccdef_frame_enable_flag[i] ) { | |
| for ( d = 0; d< 8; d++ ) { | |
| **cccdef_direction_enable_flag[i][d]** | f(1) |
| if (cccdef_direction_enable_flag[i][d] ) { | |
| **cccdef_new_filter_flag[i][d]** | f(1) |
| if (cccdef_new_filter_flag[i] ) { | |
| for ( m = 0; m< 8; m++ ) { | |
| **cccdef_filter_coeff_abs[i][d][m]** | f(coeffBits$_d$) |
| if(cccdef_filter_coeff_abs[i][d][m]) | |
| **cccdef_filter_coeff_sign[i][d][m]** | f(1) |
| } | |
| } | |
| else { | |
| **cccdef_filter_set_idx[i][d]** | f(indexBits$_d$) |
| } | |
| } | |
| } | |
| } | |
| } | |
| } | |
| } | |

FIG. 26
(Continued)

Table 7: Proposed syntax table of frame header with strength parameters

| cdef_params( ) { | **Type** |
|---|---|
| if ( CodedLossless \|\| allow_intrabc \|\| | |
| !enable_cdef) { | |
| cdef_bits = 0 | |
| cdef_y_pri_strength[0] = 0 | |
| cdef_y_sec_strength[0] = 0 | |
| cdef_uv_pri_strength[0] = 0 | |
| cdef_uv_sec_strength[0] = 0 | |
| CdefDamping = 3 | |
| return | |
| } | |
| **cdef_damping_minus_3** | f(2) |
| CdefDamping = cdef_damping_minus_3 + 3 | |
| **cdef_bits** | f(2) |
| for ( i = 0; i < (1 << cdef_bits); i++ ) { | |
| **cdef_y_pri_strength[i]** | f(4) |
| **cdef_y_sec_strength[i]** | f(2) |
| if ( cdef_y_sec_strength[i] == 3 ) | |
| cdef_y_sec_strength[i] += 1 | |
| if ( NumPlanes > 1 ) { | |
| **cdef_uv_pri_strength[i]** | f(4) |
| **cdef_uv_sec_strength[i]** | f(2) |
| if ( cdef_uv_sec_strength[i] == 3 ) | |
| cdef_uv_sec_strength[i] += 1 | |
| } | |
| } | |

FIG. 27

Table 7 (continued): Proposed syntax table of frame header with strength parameters

2701

| | |
|---|---|
| if (enable_cccdef) { | |
| for ( i = 0; i < 2; i++ ) { | |
| **cccdef_frame_enable_flag[i]** | f(1) |
| if (cccdef_frame_enable_flag[i] ) { | |
| **cccdef_new_filter_flag[i]** | f(1) |
| if (cccdef_new_filter_flag[i] ) { | |
| for ( d = 0; d< 8; d++ ) { | |
| for ( n = 0; n< 8; n++ ) { | |
| **cccdef_filter_coeff_abs[i][d][n]** | f(coeffBits) |
| if(cccdef_filter_coeff_abs[i][d][n]) | |
| **cccdef_filter_coeff_sign[i][d][n]** | f(1) |
| } | |
| } | |
| } | |
| else { | |
| **cccdef_filter_set_idx[i]** | f(indexBits) |
| } | |
| **cccdef_bits[i]** | $f(N_{bits\text{-}cccdef\text{-}bits})$ |
| for ( k = 0; k < (1 << cccdef_bits); k++ ) { | |
| **ccdef_strength_idx[i][k]** | $f(N_{bit\text{-}ccdef\_strength\_idx})$ |
| cccdef_strength_array_frame[i][k] = allowed_strength_array[ccdef_strength_idx[i][k]] | |
| } | |
| } | |
| } | |
| } | |
| } | |

FIG. 27
(Continued)

Table 8: Proposed syntax table of frame header with strength parameters

| cdef_params( ) { | **Type** |
|---|---|
| if ( CodedLossless \|\| allow_intrabc \|\| | |
| !enable_cdef) { | |
| cdef_bits = 0 | |
| cdef_y_pri_strength[0] = 0 | |
| cdef_y_sec_strength[0] = 0 | |
| cdef_uv_pri_strength[0] = 0 | |
| cdef_uv_sec_strength[0] = 0 | |
| CdefDamping = 3 | |
| return | |
| } | |
| **cdef_damping_minus_3** | f(2) |
| CdefDamping = cdef_damping_minus_3 + 3 | |
| **cdef_bits** | f(2) |
| for ( i = 0; i < (1 << cdef_bits); i++ ) { | |
| **cdef_y_pri_strength[i]** | f(4) |
| **cdef_y_sec_strength[i]** | f(2) |
| if ( cdef_y_sec_strength[i] == 3 ) | |
| cdef_y_sec_strength[i] += 1 | |
| if ( NumPlanes > 1 ) { | |
| **cdef_uv_pri_strength[i]** | f(4) |
| **cdef_uv_sec_strength[i]** | f(2) |
| if ( cdef_uv_sec_strength[i] == 3 ) | |
| cdef_uv_sec_strength[i] += 1 | |
| } | |
| } | |

FIG. 28

Table 8 (continued): Proposed syntax table of frame header with strength parameters

2801

| | |
|---|---|
| if (enable_cccdef) { | |
| for ( i = 0; i < 2; i++ ) { | |
| **ccdef_frame_enable_flag[i]** | f(1) |
| if (cccdef_frame_enable_flag[i] ) { | |
| for ( d = 0; d< 8; d++ ) { | |
| **cccdef_direction_enable_flag[i][d]** | f(1) |
| if (cccdef_direction_enable_flag[i][d] ) { | |
| **cccdef_new_filter_flag[i][d]** | f(1) |
| if (cccdef_new_filter_flag[i] ) { | |
| for ( n = 0; n< 8; n++ ) { | |
| **cccdef_filter_coeff_abs[i][d][n]** | f(coeffBitsd ) |
| if(cccdef_filter_coeff_abs[i][d][n]) | |
| **cccdef_filter_coeff_sign[i][d][n]** | f(1) |
| } | |
| } | |
| else { | |
| **cccdef_filter_set_idx[i][d]** | f(indexBitsd) |
| } | |
| } # direction enable flag | |
| } # for each direction | |
| **cccdef_bits[i]** | f($N_{bits-cccdef-bits}$) |
| for ( k = 0; k < (1 << cccdef_bits); k++ ) { | |
| **ccdef_strength_idx[i][k]** | f($_{Nbit-ccdef\_strength\_idx}$) |
| cccdef_strength_array_frame[i][k] = allowed_strength_array[ccdef_strength_idx[i][k]] | |
| } | |
| } | |
| } | |
| } | |
| } | |

FIG. 28
(Continued)

Table 9: Intra_frame_mode_info() syntax of the proposed method

| | intra_frame_mode_info( ) { | Type |
|---|---|---|
| | skip = 0 | |
| | if ( SegIdPreSkip ) | |
| | intra_segment_id( ) | |
| | skip_mode = 0 | |
| | read_skip( ) | |
| | if ( !SegIdPreSkip ) | |
| | intra_segment_id( ) | |
| | read_cdef( ) | |
| 2901 | if (enable_cccdef && ccdef_frame_enable_flag[] ) | |
| | read_cccdef( ) | |
| | read_delta_qindex( ) | |
| | read_delta_lf( ) | |
| | } | |

FIG. 29

Table 10: Inter_frame_mode_info() syntax of the proposed method

| inter_frame_mode_info( ) { | Type |
|---|---|
| use_intrabc = 0 | |
| LeftRefFrame[ 0 ] = AvailL ? RefFrames[ MiRow ][ MiCol-1 ][ 0 ] : INTRA_FRAME | |
| AboveRefFrame[ 0 ] = AvailU ? RefFrames[ MiRow-1 ][ MiCol ][ 0 ] : INTRA_FRAME | |
| LeftRefFrame[ 1 ] = AvailL ? RefFrames[ MiRow ][ MiCol-1 ][ 1 ] : NONE | |
| AboveRefFrame[ 1 ] = AvailU ? RefFrames[ MiRow-1 ][ MiCol ][ 1 ] : NONE | |
| LeftIntra = LeftRefFrame[ 0 ] <= INTRA_FRAME | |
| AboveIntra = AboveRefFrame[ 0 ] <= INTRA_FRAME | |
| LeftSingle = LeftRefFrame[ 1 ] <= INTRA_FRAME | |
| AboveSingle = AboveRefFrame[ 1 ] <= INTRA_FRAME | |
| skip = 0 | |
| inter_segment_id( 1 ) | |
| read_skip_mode( ) | |
| if ( skip_mode ) | |
| skip = 1 | |
| else | |
| read_skip( ) | |
| if ( !SegIdPreSkip ) | |
| inter_segment_id( 0 ) | |
| Lossless = LosslessArray[ segment_id ] | |
| read_cdef( ) | |
| 3001 if (enable_cccdef && ccdef_frame_enable_flag[] ) | |
| read_cccdef( ) | |
| read_delta_qindex( ) | |
| read_delta_lf( ) | |
| ReadDeltas = 0 | |
| read_is_inter( ) | |
| if ( is_inter ) | |
| inter_block_mode_info( ) | |
| else | |
| intra_block_mode_info( ) | |
| } | |

FIG. 30

Table 11: Syntax of filter block level of the proposed method

3101

| read_cccdef( ) { | Type |
|---|---|
| if ( skip \|\| CodedLossless \|\| allow_intrabc \|\| !enable_cccdef) { | |
| return | |
| } | |
| cdefSize4 = Num_4x4_Blocks_Wide[ BLOCK_64X64 ] | |
| cdefMask4 = ~(cdefSize4 - 1) | |
| r = MiRow & cdefMask4 | |
| c = MiCol & cdefMask4 | |
| cccdef_idx[ r ][ c ] | L(cccdef_bits) |
| w4 = Num_4x4_Blocks_Wide[ MiSize ] | |
| h4 = Num_4x4_Blocks_High[ MiSize ] | |
| for ( i = r; i < r + h4 ; i += cdefSize4 ) { | |
| for ( j = c; j < c + w4 ; j += cdefSize4 ) { | |
| cccdef_idx[ i ][ j ] =cccdef_idx[ r ][ c ] | |
| } | |
| } | |
| } | |

Determine, for Reconstructed Chroma Block, Offset to Direction of Reconstructed Luma Block Associated with Reconstructed Chroma Block
3301

Add Offset to Reconstructed Chroma Block
3303

Signal Filter Coefficients Used in Directional Cross Component Filter to Decoder
3305

DIRECTIONAL CROSS COMPONENT FILTER FOR VIDEO CODING

CROSS-REFERENCE TO RELATED APPLICATIONS

The disclosure claims the benefits of priority to U.S. Provisional Application No. 63/154,582, filed on Feb. 26, 2021, which is incorporated herein by reference in its entirety.

TECHNICAL FIELD

The present disclosure generally relates to video processing, and more particularly, to directional cross component filter for video coding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, the AV1 developed by the Alliance for Open Media (AOMedia), and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a video decoding method for applying a directional cross component filter, the method comprising: determining a direction of a reconstructed luma block; decoding an encoded bit stream to determine a plurality of filter coefficients associated with a directional cross component filter; and applying the plurality of filter coefficients to the reconstructed luma block to determine an offset to the direction of the reconstructed luma block.

Embodiments of the present disclosure provide a video decoding apparatus comprising a memory figured to store instructions; and one or more processors configured to execute the instructions to cause the apparatus to perform: determining a direction of a reconstructed luma block; decoding an encoded bit stream to determine a plurality of filter coefficients associated with a directional cross component filter; and applying the plurality of filter coefficients to the reconstructed luma block to determine an offset to the direction of the reconstructed luma block.

Embodiments of the present disclosure provide a non-transitory computer readable medium that stores a set of instructions that is executable by one or more processors of an apparatus to cause the apparatus to perform a video decoding method, the method comprising: determining a direction of a reconstructed luma block; decoding an encoded bit stream to determine a plurality of filter coefficients associated with a directional cross component filter; and applying the plurality of filter coefficients to the reconstructed luma block to determine an offset to the direction of the reconstructed luma block.

Embodiments of the present disclosure provide a video encoding method for applying a directional cross component filter, the method comprising: determining, for a reconstructed chroma block, an offset to a direction of a reconstructed luma block associated with the reconstructed chroma block, and adding the offset to the reconstructed chroma block, wherein the determining of the offset comprises applying a directional cross component filter to the reconstructed luma block.

Embodiments of the present disclosure provide a video encoding apparatus comprising a memory figured to store instructions; and one or more processors configured to execute the instructions to cause the apparatus to perform: determining, for a reconstructed chroma block, an offset to a direction of a reconstructed luma block associated with the reconstructed chroma block, and adding the offset to the reconstructed chroma block, wherein the determining of the offset comprises applying a directional cross component filter to the reconstructed luma block.

Embodiments of the present disclosure provide a non-transitory computer readable medium that stores a set of instructions that is executable by one or more processors of an apparatus to cause the apparatus to perform a video encoding method, the method comprising: determining, for a reconstructed chroma block, an offset to a direction of a reconstructed luma block associated with the reconstructed chroma block, and adding the offset to the reconstructed chroma block, wherein the determining of the offset comprises applying a directional cross component filter to the reconstructed luma block.

BRIEF DESCRIPTION OF THE DRAWINGS

Embodiments and various aspects of the present disclosure are illustrated in the following detailed description and the accompanying figures. Various features shown in the figures are not drawn to scale.

FIG. 19 shows a table of exemplary neighboring positions of a 9-tap cross shape filter, according to some embodiments of the present disclosure.

FIG. 20 shows an exemplary sequence header syntax for determining whether to signal an enable_cccdef flag, according to some embodiments of the present disclosure.

FIG. 21 shows an exemplary sequence header syntax for determining whether to signal an enable_cccdef flag, according to some embodiments of the present disclosure.

FIG. 23 shows an exemplary frame header syntax, according to some embodiments of the present disclosure.

FIG. 25 shows an exemplary frame header syntax, according to some embodiments of the present disclosure.

FIG. 26 shows an exemplary syntax table, according to some embodiments of the present disclosure.

FIG. 27 shows an exemplary syntax table, according to some embodiments of the present disclosure.

FIG. 28 shows an exemplary syntax table, according to some embodiments of the present disclosure.

FIG. 29 shows an exemplary syntax table, according to some embodiments of the present disclosure.

FIG. 30 shows an exemplary syntax table, according to some embodiments of the present disclosure.

FIG. 31 shows an exemplary syntax table, according to some embodiments of the present disclosure.

DETAILED DESCRIPTION

Figure 1:
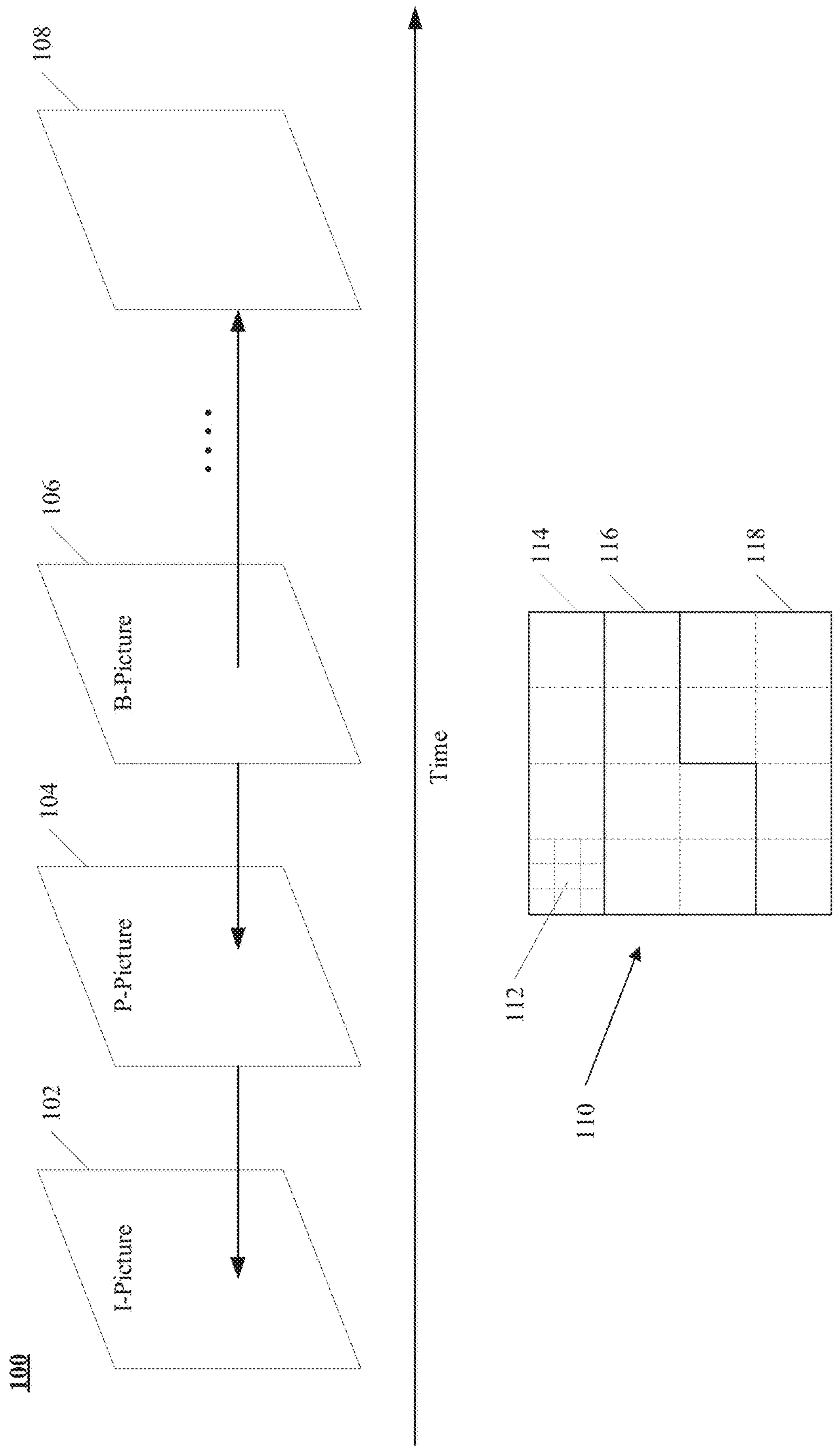
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

The embodiments provided by the present disclosure are directed to encoding and/or decoding video information. A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x, AVS series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIGS. 1, 2A, 2B, 3A, 3B, and 4 illustrate the general aspects of the video encoding/decoding apparatuses and processes used in the disclosed embodiments. Specifically, FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC, H.266/VVC, or AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC, H.266/VVC or AVS). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, H.264/AVC, or AVS), or as "coding units" ("CUs") in some other video coding standards (e.g., H.265/HEVC, H.266/VVC, or AVS). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
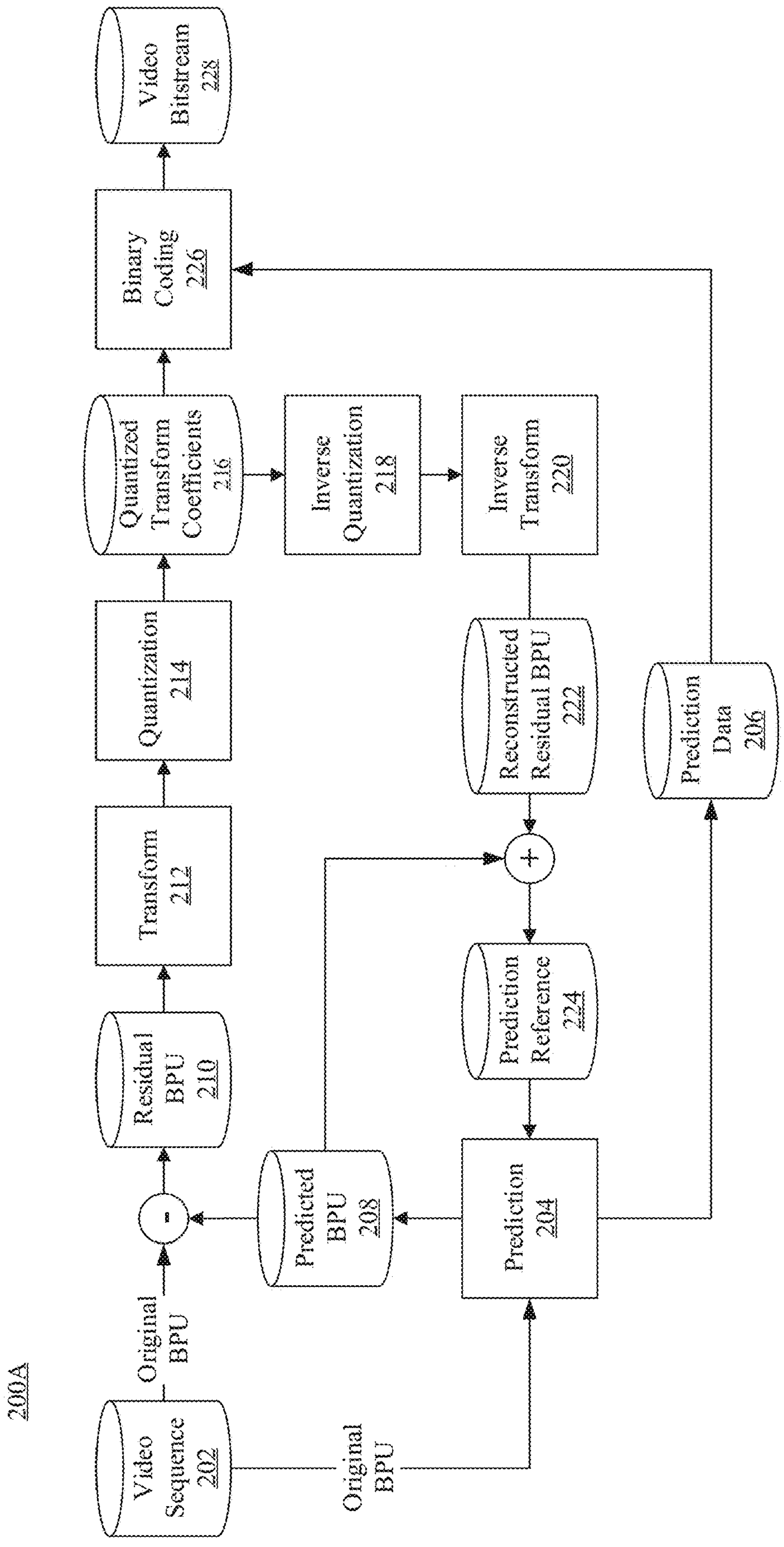
FIG. 2A is a schematic diagram illustrating an exemplary encoding process of a hybrid video coding system, according to some embodiments of the present disclosure.
Figure 2B:
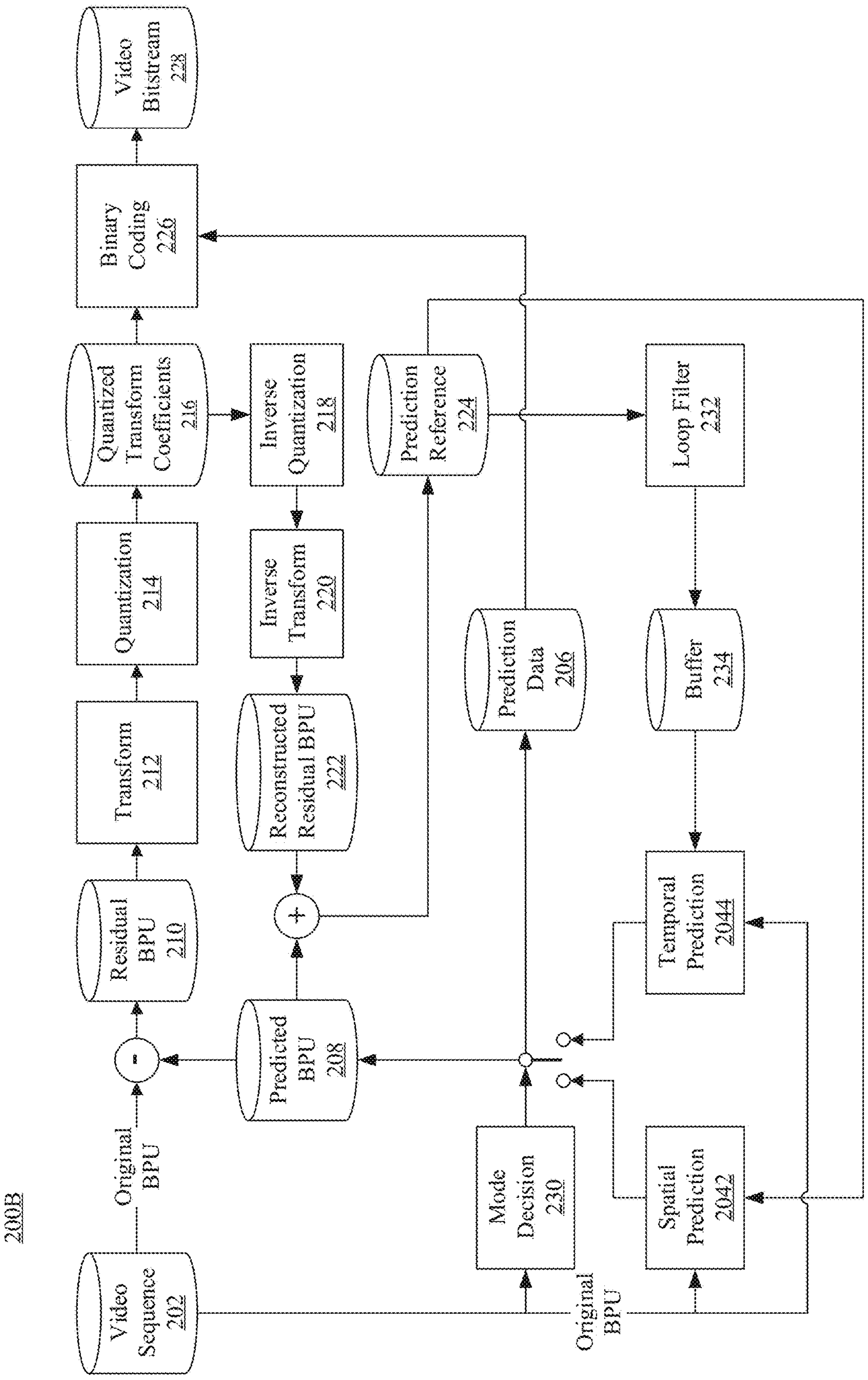
FIG. 2B is a schematic diagram illustrating another exemplary encoding process of a hybrid video coding system, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC, H.266/VVC, or AVS), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC, H.266/VVC, or AVS), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC, H.266/VVC, or AVS), at the level of which the transform operation can be performed. It should be noted that the division schemes of the same basic processing sub-unit can be different at the prediction stage and the transform stage. For example, in H.265/IEVC, H.266/VVC, or AVS, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/IEVC, H.266/VVC and AVS provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
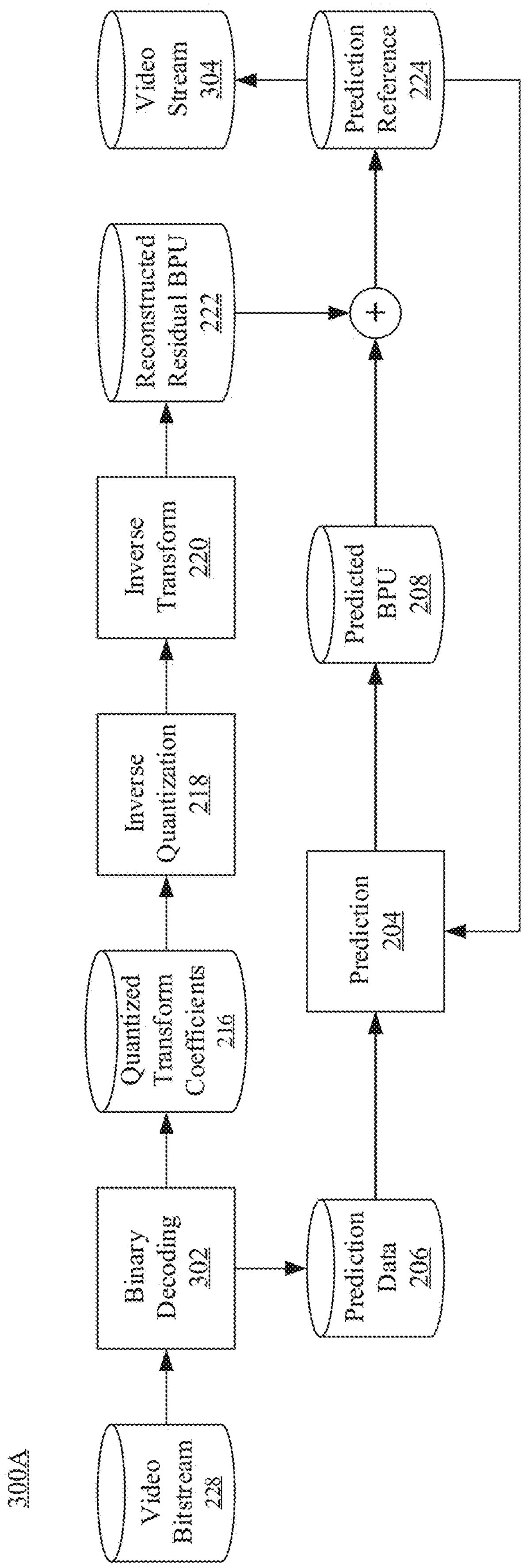
FIG. 3A is a schematic diagram illustrating an exemplary decoding process of a hybrid video coding system, according to some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
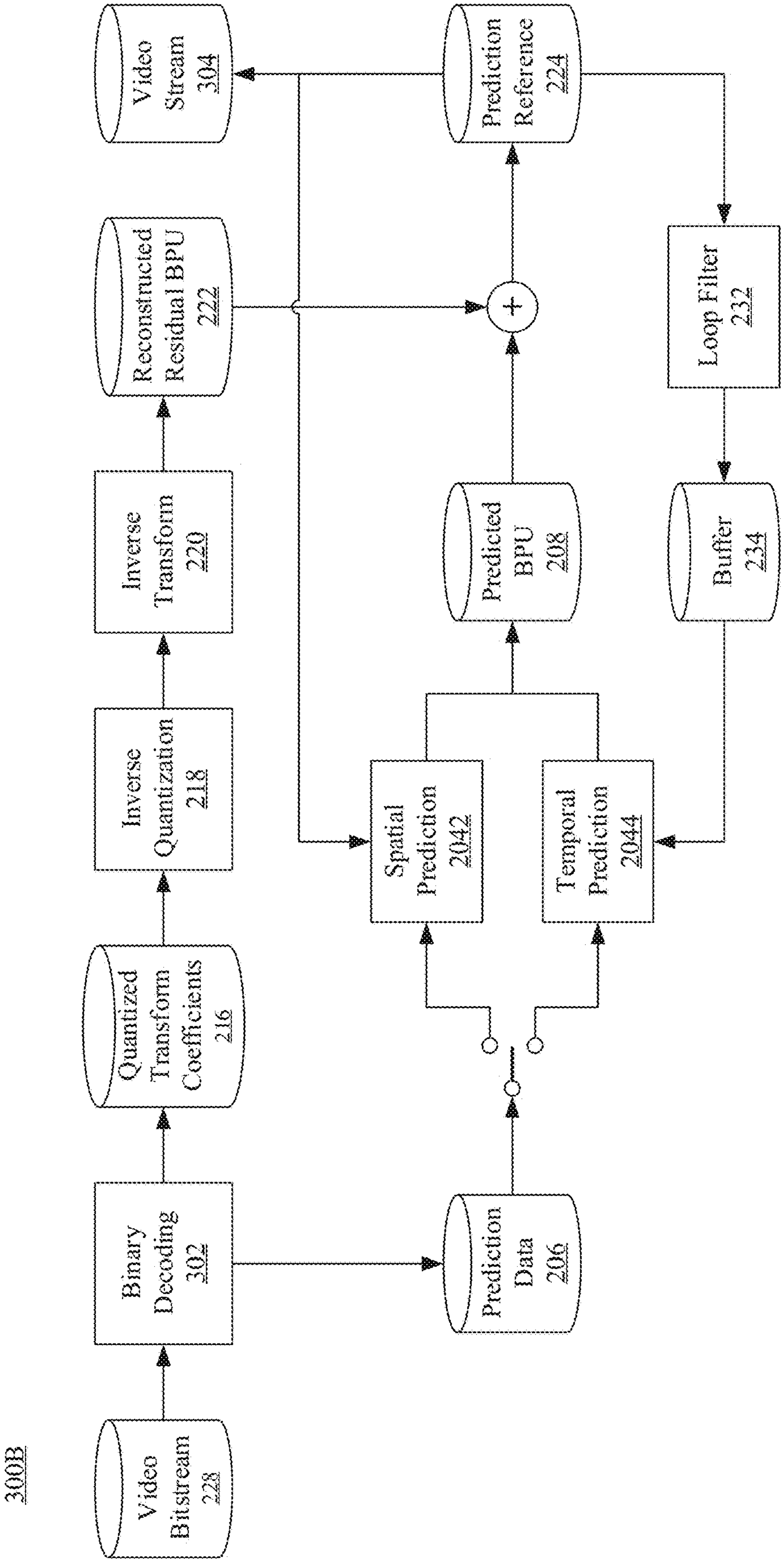
FIG. 3B is a schematic diagram illustrating another exemplary decoding process of a hybrid video coding system, according to some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
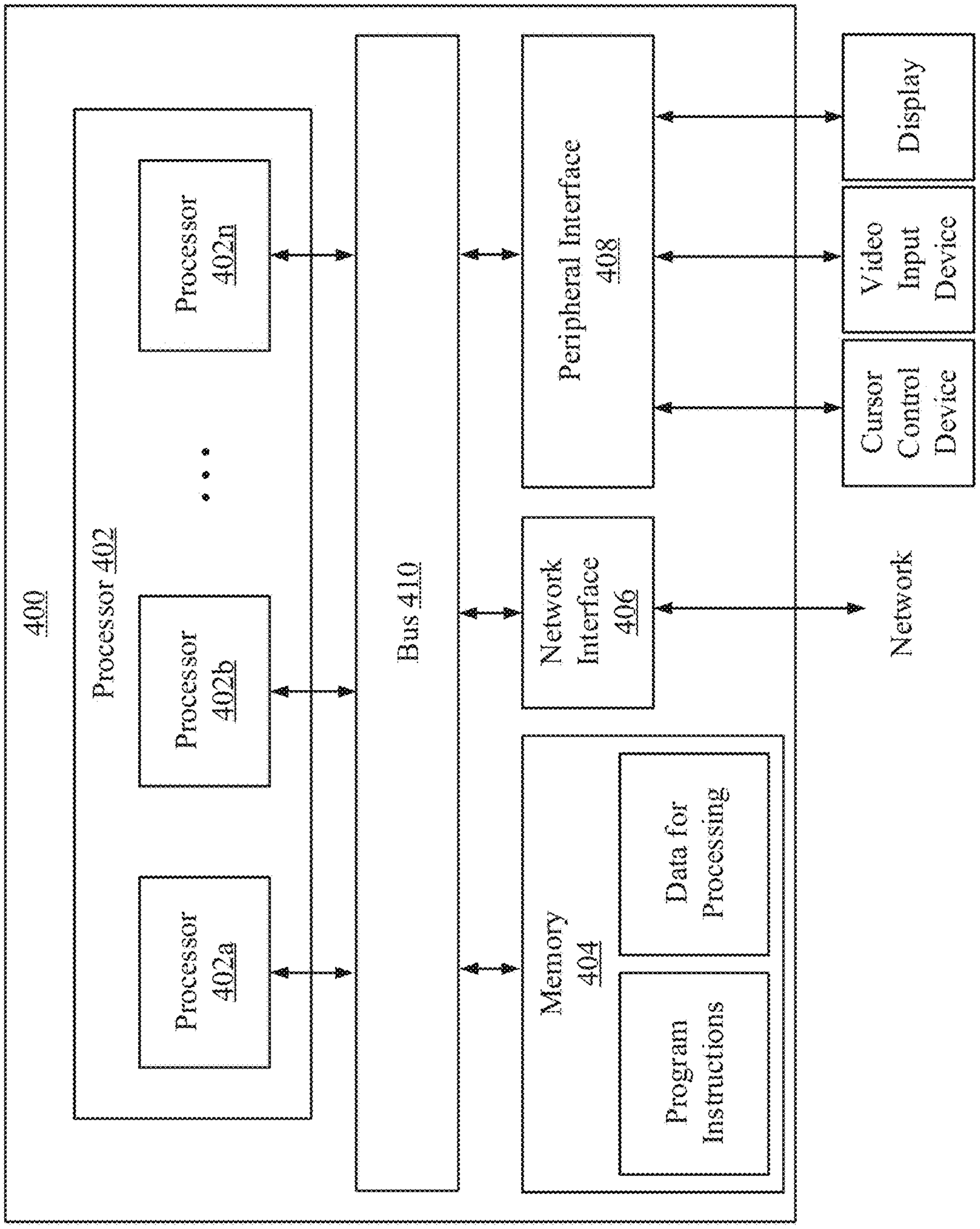
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides a directional cross component filter for use to performing directional filtering of a chroma block based on a direction of a luma block associated with the chroma block. In some embodiments, the disclosed directional cross component filter may be used in AOMedia Video 1 (AV1) codecs. AV1 is a video coding standard developed by the Alliance for Open Media (AOMedia), which is an industry consortium founded in 2015. AV1 is based on the same hybrid video coding system that has been used in modern video compression standards such as HEVC, H.264/AVC, MPEG2, H.263, etc. Thus, the general aspects of the video coding apparatuses and methods illustrated in FIGS. 1, 2A, 2B, 3A, 3B, and 4 are also applicable to the disclosed directional cross component filter.

Figure 5:
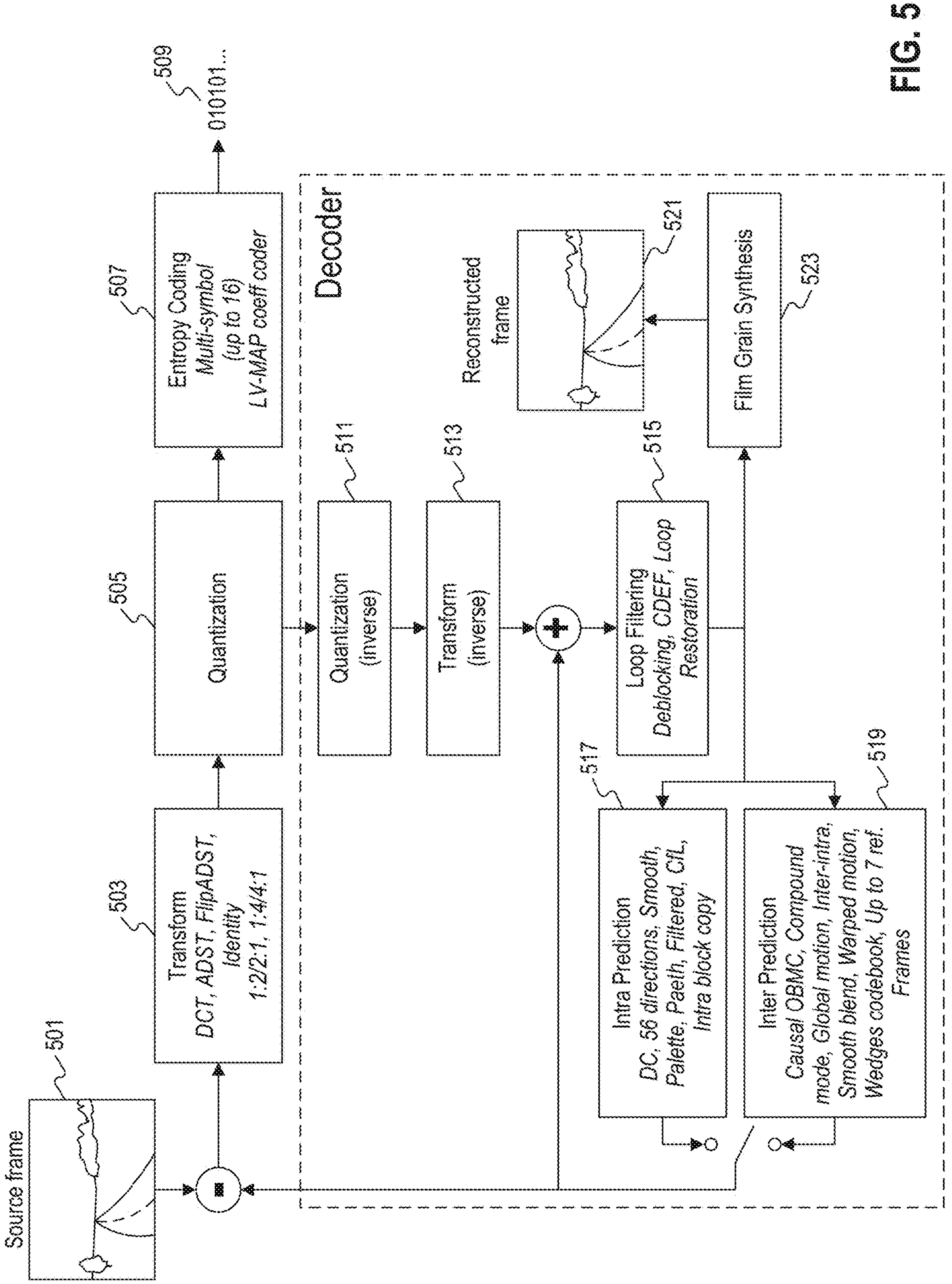
FIG. 5 is a block diagram of an AOMedia Video 1 (AV1) codec, according to some embodiments of the present disclosure.

FIG. 5 shows a block diagram of a AV1 video coding system, according to some disclosed embodiments. The input video (e.g., each source frame 501) is processed block by block. In AV1, a super block is the largest block unit, and can be as large as 128×128 luma samples (plus the corresponding chroma samples depending on the chroma format). A superblock may be further partitioned into coding blocks using predefined partition structures. AV1 partition tree supports 10 different partitioning patterns including no split mode. At the leaf nodes of the partitioning structure, coding information such as coding mode (intra mode or inter mode), motion information (reference index, motion vectors, etc.) if inter coded, and quantized residual coefficients are sent. If intra prediction 517 (also called spatial prediction) is used, spatial neighboring samples are used to predict the current block. If inter prediction 519 (also called temporal prediction or motion compensated prediction) is used, samples from already coded pictures called reference pictures are used to predict the current block.

After intra or inter prediction, the mode decision and encoder control block chooses the best prediction mode for the current block, for example based on the rate-distortion optimization method. Based on the best prediction mode, the prediction block is generated and subtracted from the input video block. The prediction residual is sent to the transform module 503 and quantization module 505 to generate the quantized residual coefficients. The quantized residual coefficients are then inverse quantized at inverse quantization module 511 and inverse transformed at inverse transform module 513, to generate the reconstructed residual. The prediction block and the reconstructed residual are added together to form the reconstructed block before loop filtering, to provide reference samples for intra prediction. Loop filtering module 515, employing one or more of deblocking, constraint directional enhancement filter (CDEF), and loop restoration filter, etc., may be applied to the reconstructed blocks to form the reconstructed block after loop filtering, which is stored in the decoded picture buffer, and used to provide reference samples for inter prediction. Coding information such as coding mode (intra or inter prediction), intra prediction mode, motion information, quantized residual coefficients, etc., are sent to the entropy coding module 507 to further reduce the bit rate before being packed into the output video bitstream 509.

Figure 6:
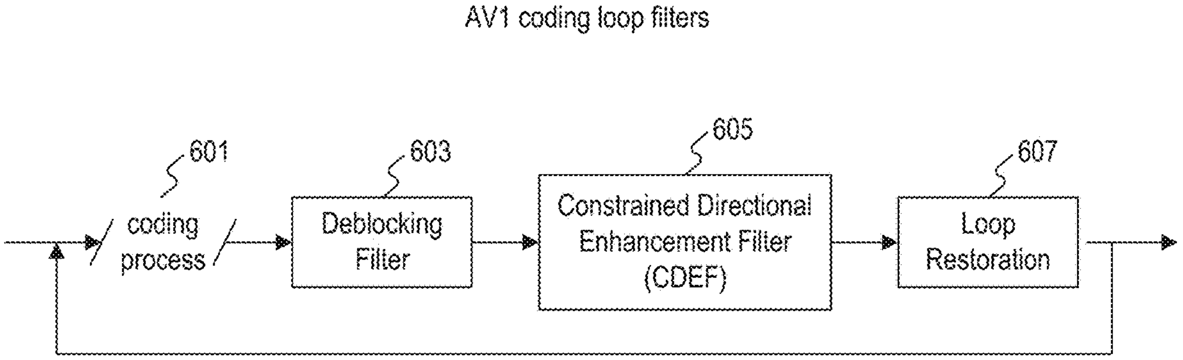
FIG. 6 is a schematic diagram illustrating AV1 in-loop filters, according to some embodiments of the present disclosure.

AV1 allows several in-loop filtering techniques successively applied to a decoded frame. In AV1, three in-loop filtering techniques (deblocking, CDEF, and loop restoration filter) are cascaded as shown in FIG. 6. Specifically, after certain coding process 601 (e.g., motion estimation, reconstruction, etc.), stage 603 is a deblocking filter which is similar the deblocking filter used in VP9. Constrained Directional Enhancement Filter (CDEF) 605 is a deringing filter designed to be applied after deblocking that works by estimating edge directions. Finally, in the loop restoration process 607, one of the two filtering methods separable symmetric normalized Wiener filter or dual self-guided filter is used after CDEF.

Figure 7:
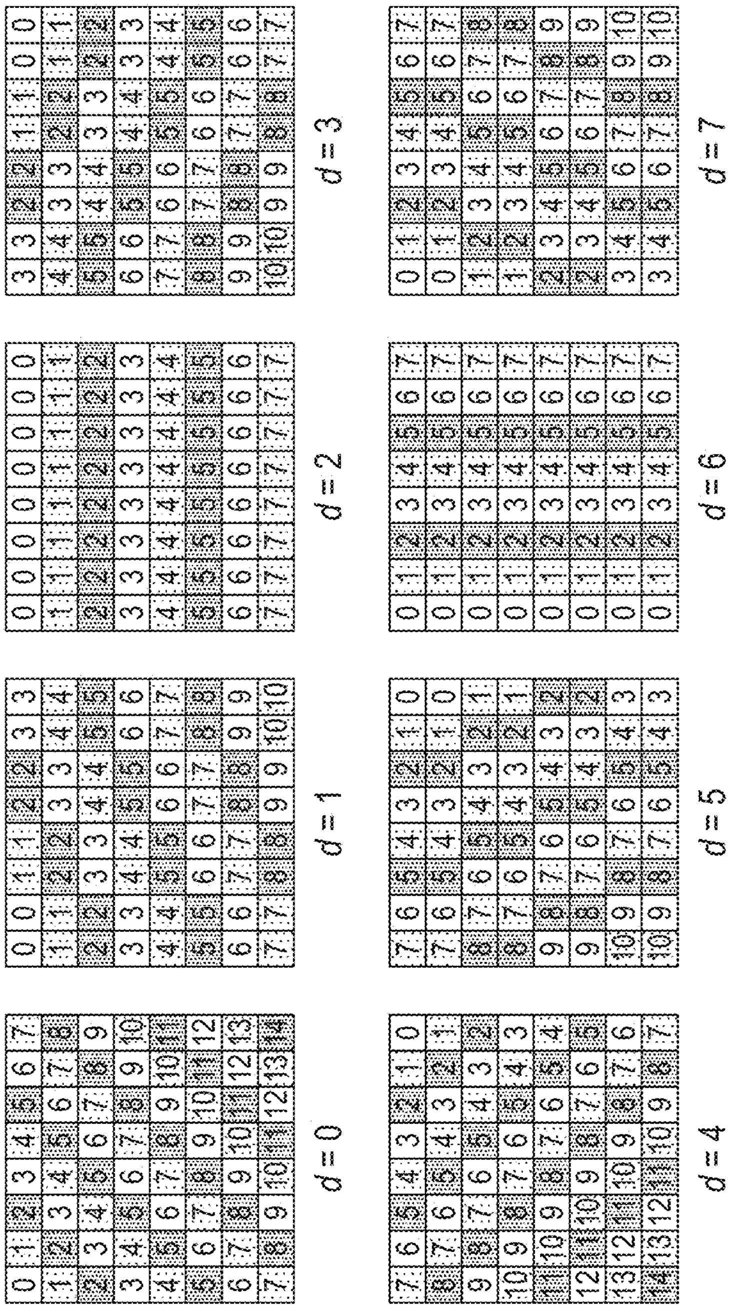
FIG. 7 is a schematic diagram illustrating 8 directions of a constraint directional enhancement filter (CDEF) process, according to some embodiments of the present disclosure.
Figure 8:
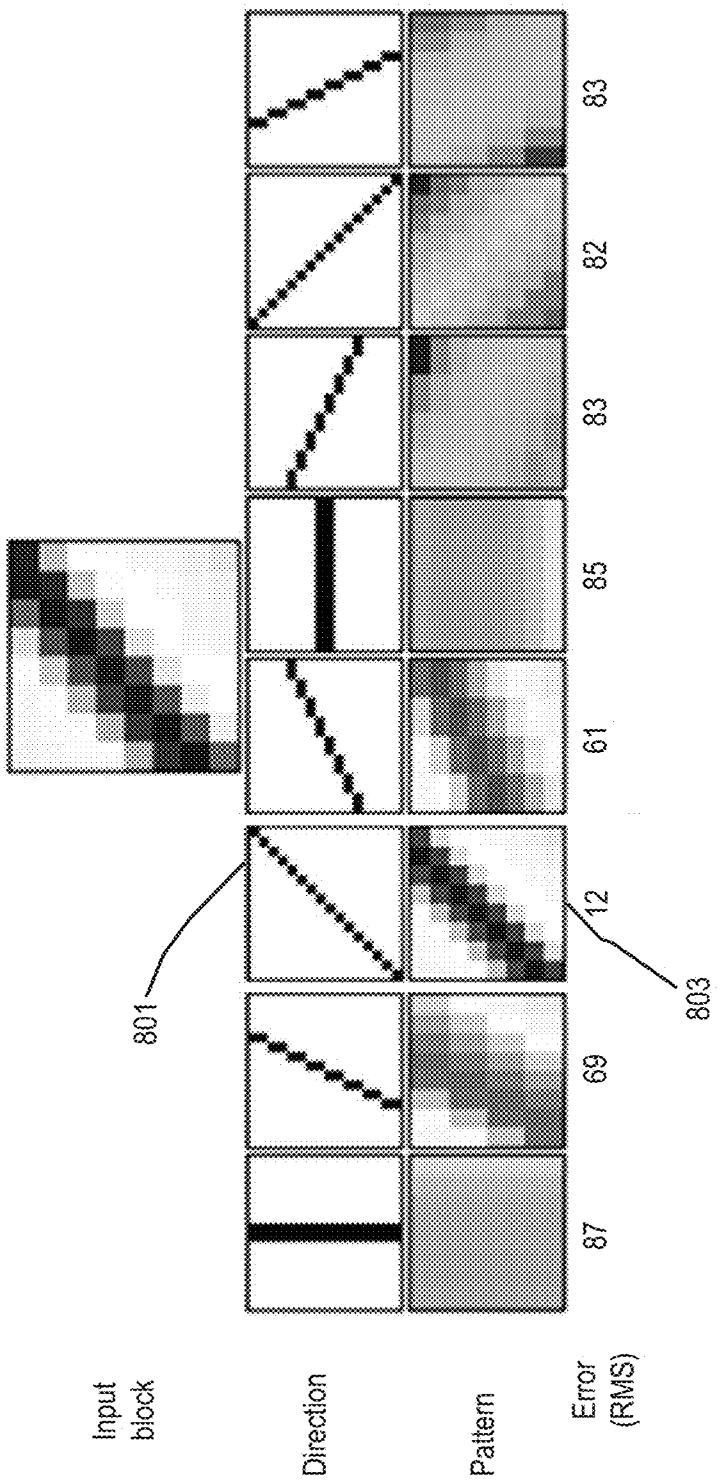
FIG. 8 is a schematic diagram illustrating examples of direction searching, according to some embodiments of the present disclosure.

The main goal of the in-loop CDEF is to filter out coding artifacts (especially the ringing artifacts) while retaining the details of the image. In CDEF process, an 8×8 image block is classified as one of the predefined 8 directions. FIG. 7 shows the supported directions of an 8×8 image block. Since the direction search operates on the reconstructed block (after deblocking), it is not required to signal the direction to the decoder because reconstructed block is already available in the decoder before applying filter. The decoder computes the direction per 8×8 block using a normative fast search algorithm that minimizes the quadratic error from a perfect directional pattern. For each block, the direction is determined by minimizing the root-mean-square (RMS) error between the reconstructed block and the closest perfectly directional block. A good directional block is a block where all of the pixels along a line in one direction have the same value. FIG. 8 shows an example of the directional search process, which finds that the edge pattern in a reconstructed block 803 has the smallest RMS error from a perfect direction 801. In CDEF, the directions of the chroma blocks are not computed, instead, the direction of collocated luma block is reused.

The CDEF filter is only applied to blocks with a coded prediction residue. In other words, if a block is coded as skip mode, the filter is not applied for that block. The filter can be expressed as:

$$y(i,j)=\mathrm{rec}(i,j)+\Sigma(w_{m,n}*f(\mathrm{rec}(m,n)-\mathrm{rec}(i,j),S,D)) \quad \text{Eq. 1}$$

In Eq. 1, rec(i,j) is the decoded pixel value before the filtering process, y(i,j) is the filtered pixel value, rec(m, n) is the neighboring pixel, and $w_{m,n}$ is the filter coefficient of the neighbor pixel. The $f(\ )$ function modifies the difference between the pixel to be filtered and a neighbor and is determined by two parameters, a strength S and a damping value D, that are specified at the 64×64 block level and frame level respectively. The strength S clamps the maximum difference allowed minus a ramp-down controlled by D.

CDEF parameters are signaled at the frame level, and some may be signaled at the filter block level. The damping D, the number of bits used for filter block signaling (0-3), and a list of 1, 2, 4 or 8 presets are signaled at the frame level. One preset contains the luma and chroma primary strengths, the luma and chroma secondary strengths. For each filter block, encoder signals to the decoder to indicate which preset is used. The filter parameters are only coded for filter blocks that have some coded residual. Such "skipped" filter blocks have CDEF disabled. The filter coefficients of the CDEF process is fixed and do not need to signal to the decoder. The more detail description of the CDEF process and strength S and damping D can be found in the AV1 specification.

Figure 9:
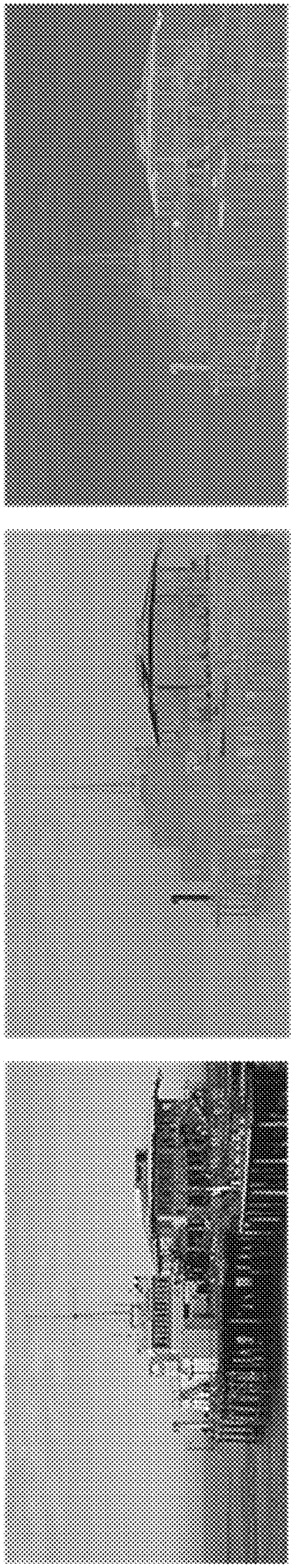
FIG. 9 is a schematic diagram illustrating an exemplary process for cross component correlation, according to some embodiments of the present disclosure.

Usually, the image/video sequences contain three color components (YCbCr or RGB). AV1 in-loop filtering process do not consider cross components correlations. In natural video sequences, one color component may be correlated to another color component especially along the direction of edge. FIG. 9 shows an example of cross component correlation which shows high correlation between Y, Cb, and Cr color components along the direction of an edge.

The present disclosure provides methods for solving the above described problems.

Figure 10:
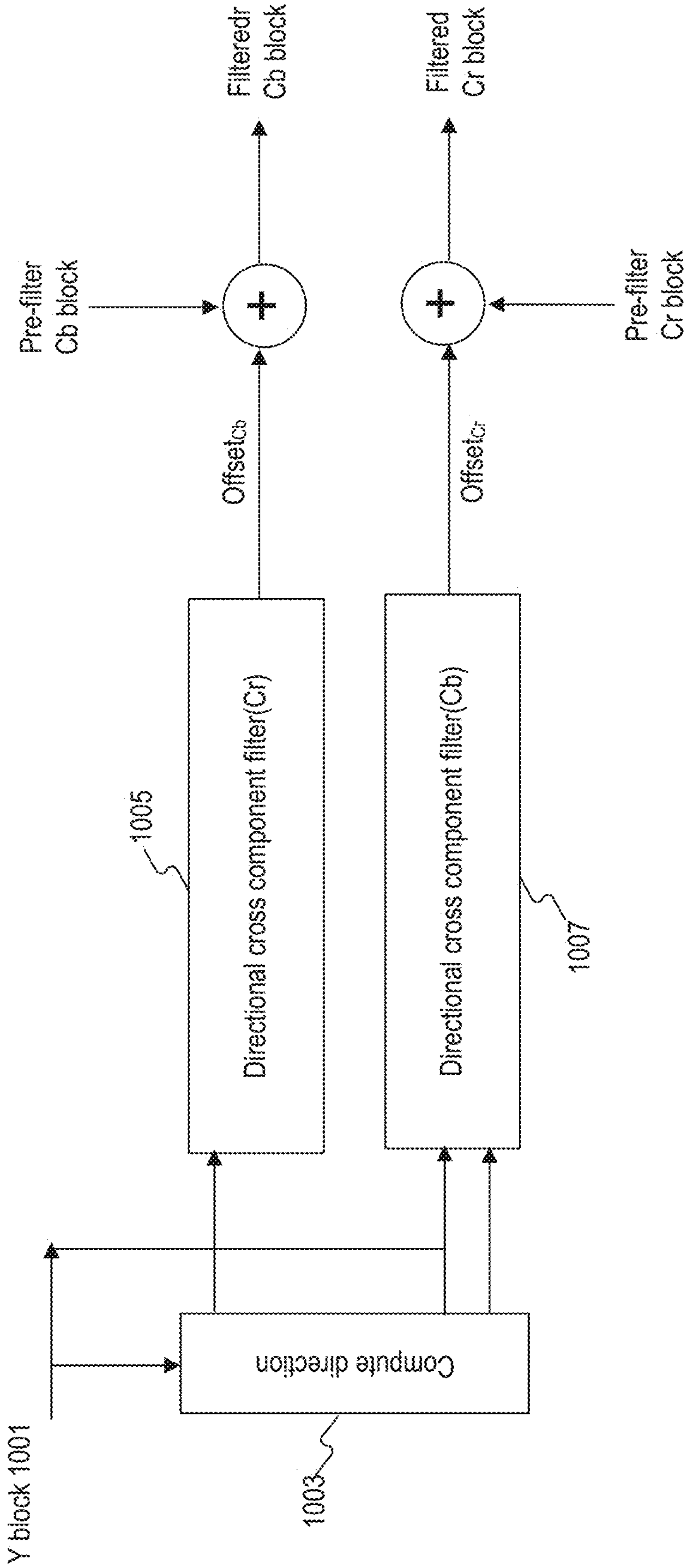
FIG. 10 is a schematic diagram illustrating an exemplary architecture of proposed directional cross component filter, according to some embodiments of the present disclosure.
Figure 11:
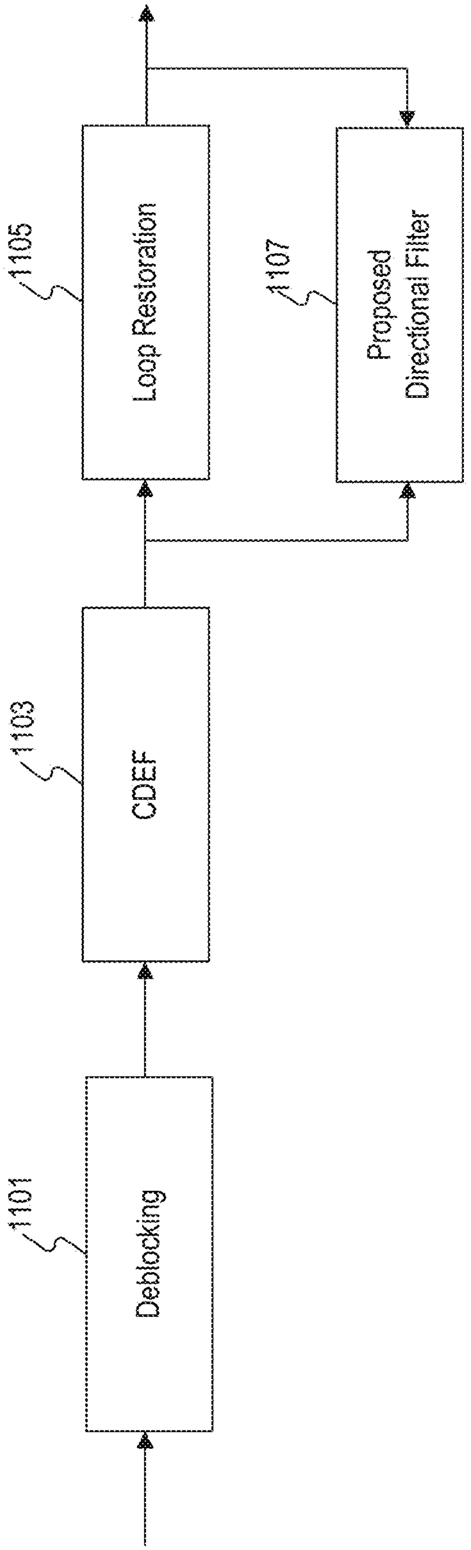
FIG. 11 is a schematic diagram illustrating an exemplary process for applying directional filter in parallel to loop restoration, according to some embodiments of the present disclosure.
Figure 12:
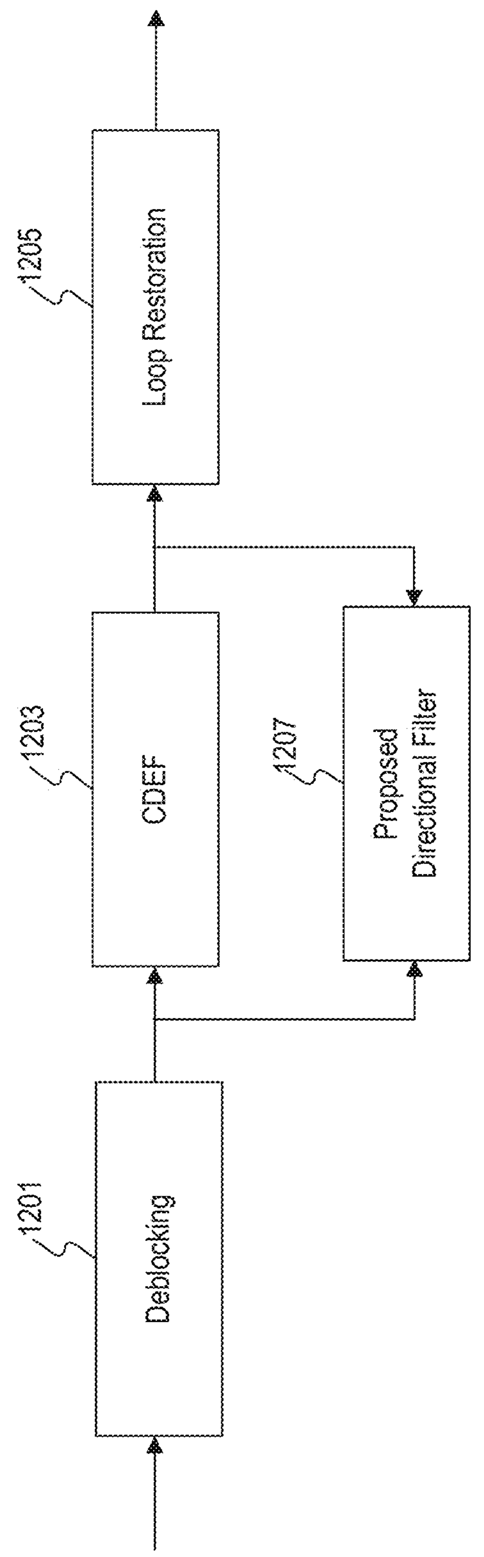
FIG. 12 is a schematic diagram illustrating an exemplary process for applying directional filter in parallel to CDEF, according to some embodiments of the present disclosure.
Figure 13:
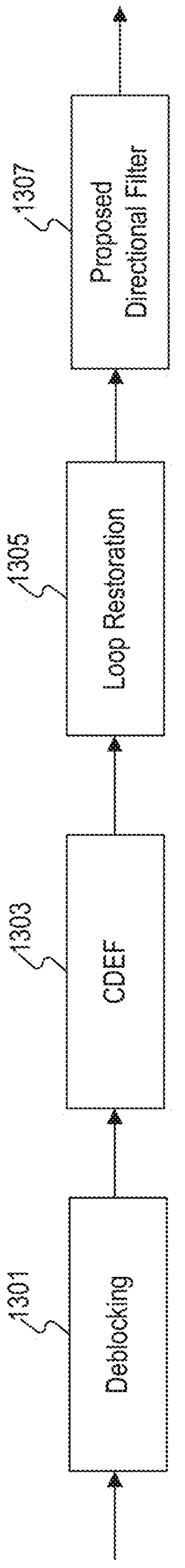
FIG. 13 is a schematic diagram illustrating an exemplary process for applying directional filter after loop restoration, according to some embodiments of the present disclosure.
Figure 14:
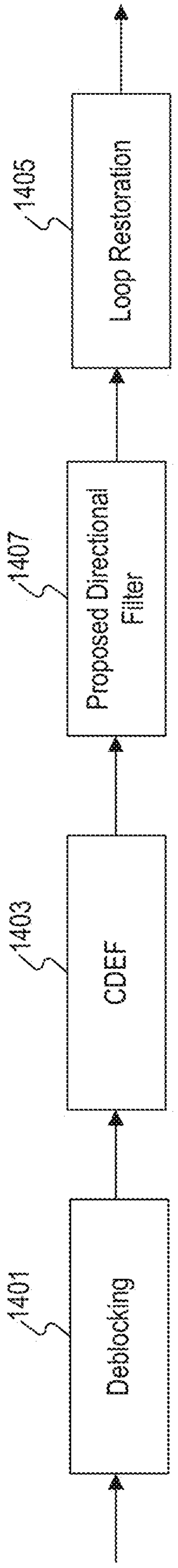
FIG. 14 is a schematic diagram illustrating an exemplary process for applying directional filter after CDEF and before loop restoration, according to some embodiments of the present disclosure.

According to some embodiments of the present disclosure, in order to improve the compression performance, a directional cross component filter is proposed. In the proposed method, an offset is generated for each chroma sample from the collocated and neighboring luma samples. The filter is operated in block-by-block basis. For each luma block, a direction is computed from the reconstructed luma block and the filter coefficients for that direction are generated and signaled to the decoder. FIG. 10 shows an exemplary architecture of the proposed cross component filtering method, according to some embodiments. As shown in FIG. 10, a directional cross component filter 1005 may be provided for the chroma component Cr, and a directional cross component filter 1007 may be provided for the chroma component Cb. A collocated reconstructed luma (Y) block 1001 and the computed direction 1003 of the collocated reconstructed luma block are inputted to each of directional cross component filters 1005 and 1007, which generate the correction offsets ($\mathrm{Offset}_{Cb}$ and $\mathrm{Offset}_{Cr}$) for the respective chroma components. The proposed directional cross component filtering method can be applied at any part of the in-loop filtering process. FIG. 11 shows an example in which a directional cross component filter 1107 is applied in parallel to a loop restoration unit 1105. FIG. 12 shows an example in which a directional cross component filter 1207 is applied in parallel to a CDEF unit 1203. FIG. 13 shows an example in which a directional cross component filter 1307 is applied after loop restoration 1305. And FIG. 14 show an example in which a directional cross component filter 1407 is applied after CDEF 1403 but before loop restoration 1405.

Figure 15:
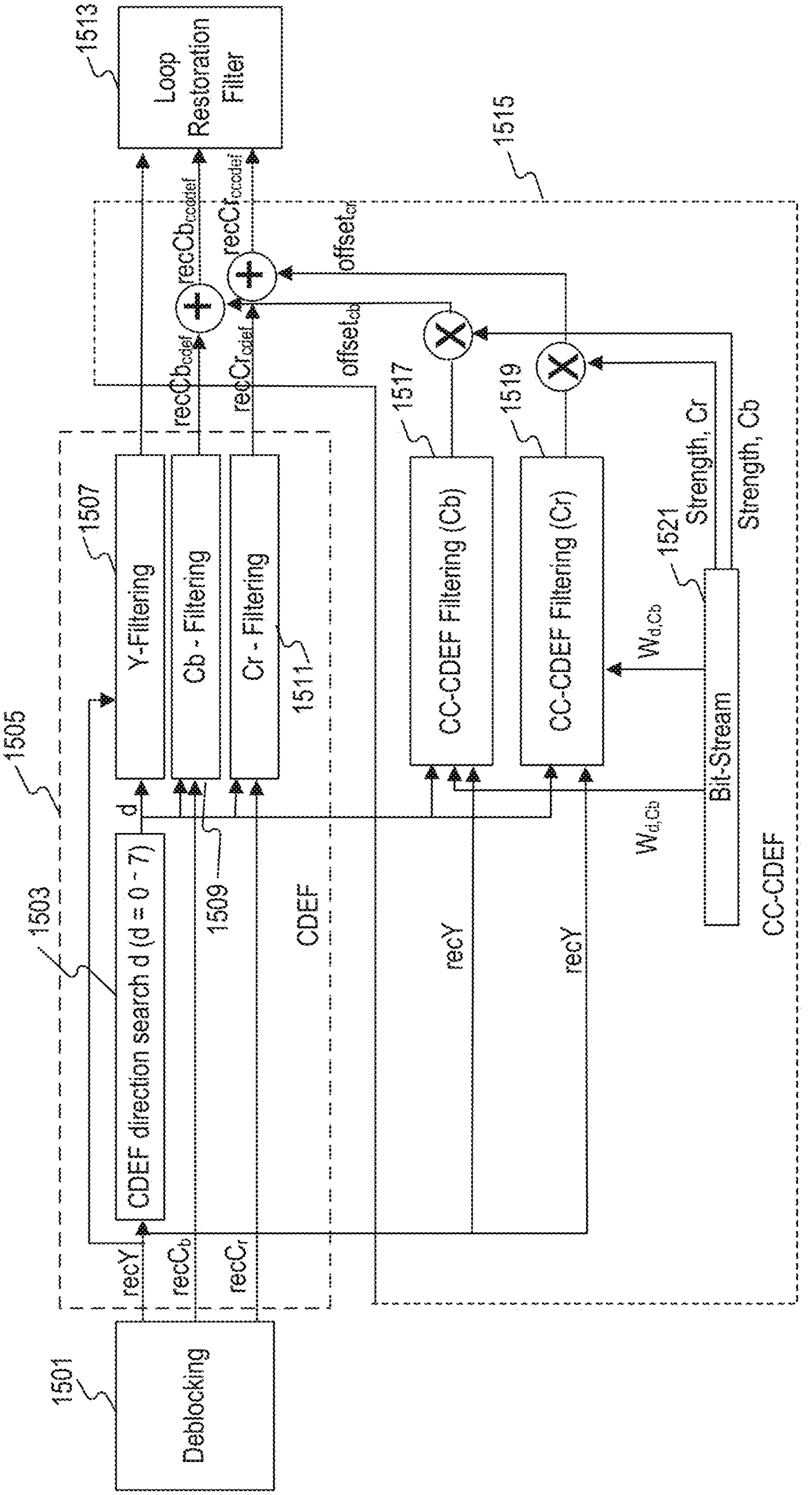
FIG. 15 is a schematic diagram illustrating an exemplary process for directional cross component filter, according to some embodiments of the present disclosure.

FIG. 15 shows a flow diagram for performing directional cross component filtering in parallel to existing AV1 CDEF filtering process, according to some embodiments. As shown in FIG. 15, the output of deblocking unit 1501 is provided to a CDEF filtering unit 1505. Specifically, the reconstructed luma (Y) block outputted by deblocking unit 1501 is provided to CDEF filtering unit 1505 for performing CDEF direction search 1503 and luma CDEF filtering 1507; and the reconstructed Cb and Cr blocks outputted by deblocking unit 1501 are provided to CDEF filtering unit 1505 for performing Cb CDEF filtering 1509 and Cr CDEF filtering 1511. In addition, the reconstructed luma block generated by deblocking unit 1501 and the direction outputted by CDEF direction search 1503 are inputted to each of CC-CDEF filtering unit 1517 and CC-CDEF filtering unit 1519, to perform the disclosed directional cross component filtering for the Cb component and Cr component, respectively. CC-CDEF filtering unit 1517 and CC-CDEF filtering unit 1519 are part of a CC-CDEF unit 1515, and are configured to generate an offset for each of the Cr and Cb components. The offsets are then used to correct the reconstructed Cr and Cb blocks generated by Cb CDEF filtering 1509 and Cr CDEF filtering 1511, respectively. The corrected reconstructed Cr and Cb blocks are provided to loop restoration filter 1513. Bit stream 1521 supplies the parameters used by the CC-CDEF filtering process, as well as the strengths for applying the offsets to the reconstructed Cr and Cb blocks, respectively.

In the rest of the disclosure, the proposed directional cross component filtering method is also referred to as cross component CDEF (CC-CDEF) process when the directional cross component filter is applied in parallel to existing CDEF. The input of the proposed directional cross component filtering is the reconstructed luma samples after the deblocking filter and the direction d of the luma block (e.g., generated by CDEF 1503). Since the direction of a luma block is already computed in the existing CDEF, in the example shown in FIG. 15, the proposed CC-CDEF can re-use the direction d computed in the CDEF process. However, the proposed method can also be implemented based on a different method to calculate the direction d designed just for the directional cross component filtering process itself.

Mathematically, the proposed filtering method can be defined as follow:

$$\text{offset}(p, q) = \left(\sum_{0}^{N-1} w_d(x, y) * \{recY(x, y) - recY(i, j)\} + roundFactor1\right) \gg shift1 \quad \text{Eq. 2}$$

$$recC_{cccdef}(p, q) = recC_{cdef}(p, q) + (\text{strength} * \text{offset}(p, q) + roundFactor2 \gg shift2 \quad \text{Eq. 3}$$

In the above equations, (p, q) is the p, q th position of the chroma sample to be filtered, (i, j) is the collocated luma position of the chroma sample to be filtered, (x, y) is the position of the neighboring luma samples, recY (i, j) is the intensity of the reconstructed luma sample after the deblocking and before CDEF process at (i, j) position, $w_d$ (x, y) is the filter coefficient of (x, y) neighbors of direction d, and $recCc_{def}$ (p, q) is the reconstructed chroma sample after CDEF process at (p, q) position. It is the chroma sample to be filtered. Nis the number of filter taps minus 1 (i.e., number of neighboring luma samples of the collocated position used for filtering). For instance, N=8 in the filter shown in FIG. 16. In Eq. 3 above, strength is the control parameter to control the effect of filtering. The value of strength can be any positive integer. For example, strength value can be from 0 to 4, inclusive. recCcccdef(p, q) is the output of the CC-CDEF filtering process at (p, q) location. Shift1 is the normalization factor. For instance, Shift1=6. roundFactor1 is the rounding offset and can be defined as (1<<(Shift1−1)). For instance, Shift2=2. roundFactor2 is the rounding offset and can be defined as (1<<(Shift2−1)).

In some embodiments, the proposed filter can also be implemented as follows (which is mathematically equivalent to Eq. 2).

$$\text{offset}(p, q) = \left(w_d(i, j) * recY(i, j) + \sum_{0}^{N-1} w_d(x, y) * recY(x, y) + roundFactor1\right) \gg shift1 \quad \text{Eq. 4}$$

where the filter weight of the collocated luma position (i, j) can be derived as follows:

$$w_d(i, j) = -\sum_{0}^{(N-1)} w_d(x, y) \quad \text{Eq. 5}$$

The proposed directional cross component filtering method is performed in block-by-block basis. The proposed method is not limited to any specific block size and can be implemented for any-block size. An example of the block size is 8×8 luma block level. If the operated block-size is 8×8 luma block, and if the proposed directional cross component filter is applied in parallel to existing CDEF (as shown in FIG. 15) the proposed method can re-use the direction of a given 8×8 block computed in the CDEF process. As shown in FIG. 15, the effect of filtering is controlled by two parameters (filter weights $w_d$ and strength). The filter weights and strengths are signaled in the bit stream. The detail of the signaling will be described at the later part of this disclosure.

Figure 16:
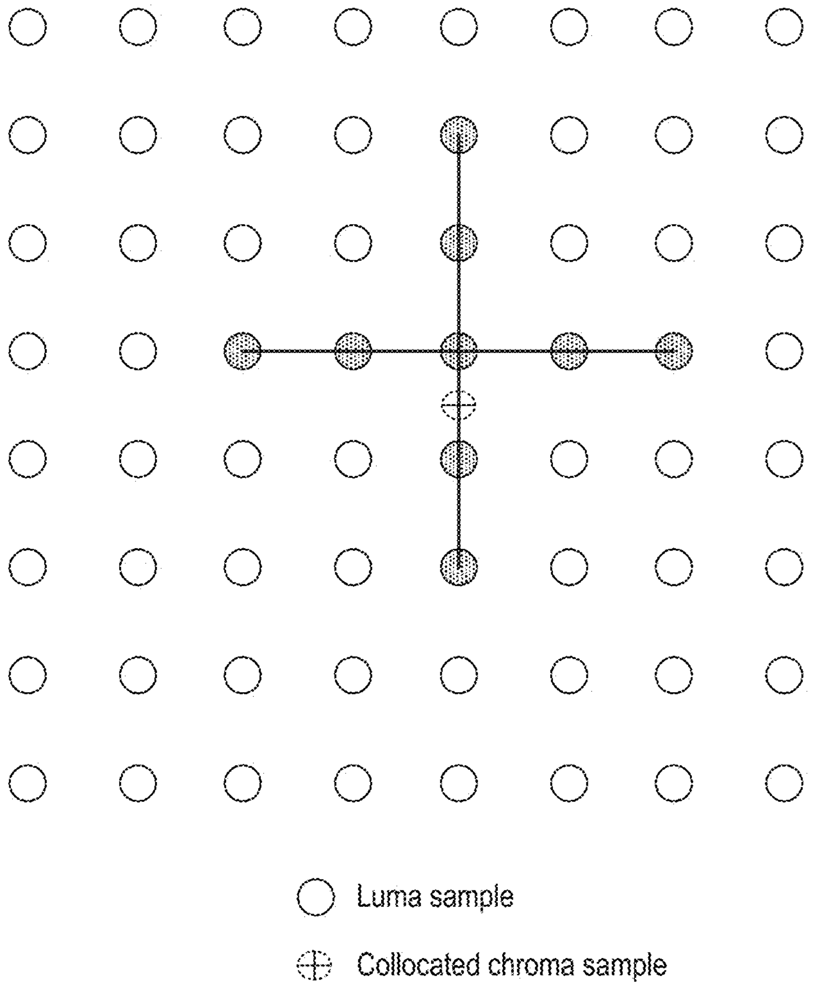
FIG. 16 is a schematic diagram illustrating an exemplary 9-tap cross shape filter, according to some embodiments of the present disclosure.
Figure 17:
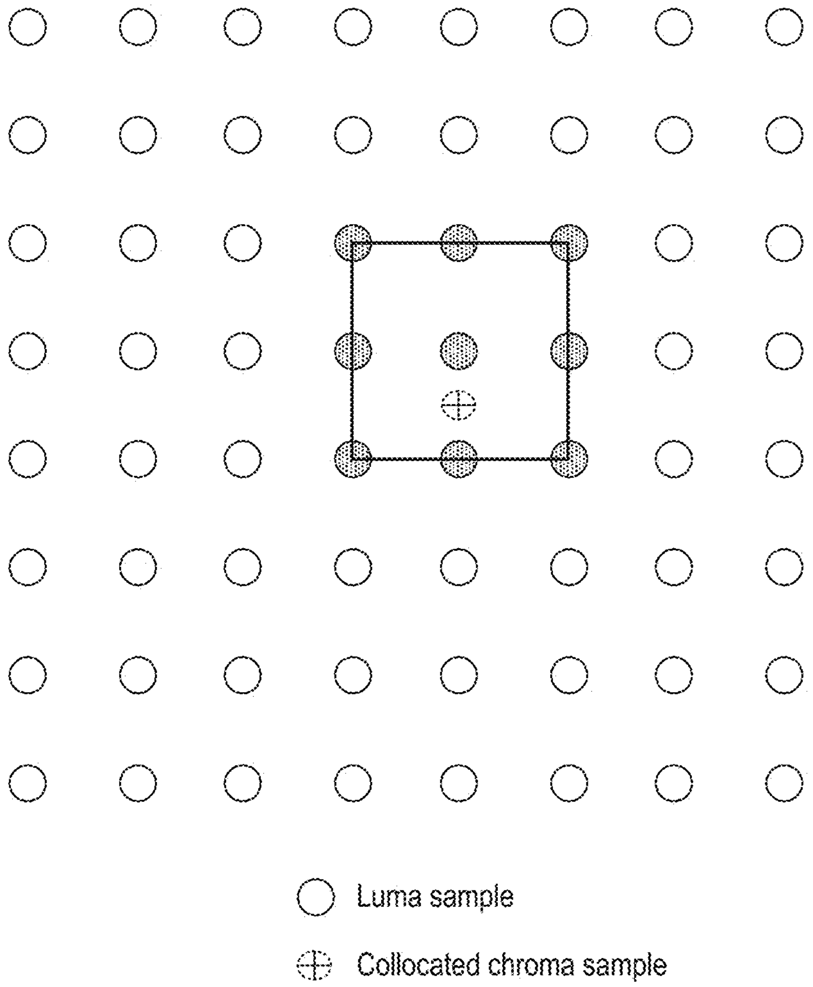
FIG. 17 is a schematic diagram illustrating an exemplary 9-tap square shape filter, according to some embodiments of the present disclosure.
Figure 18:
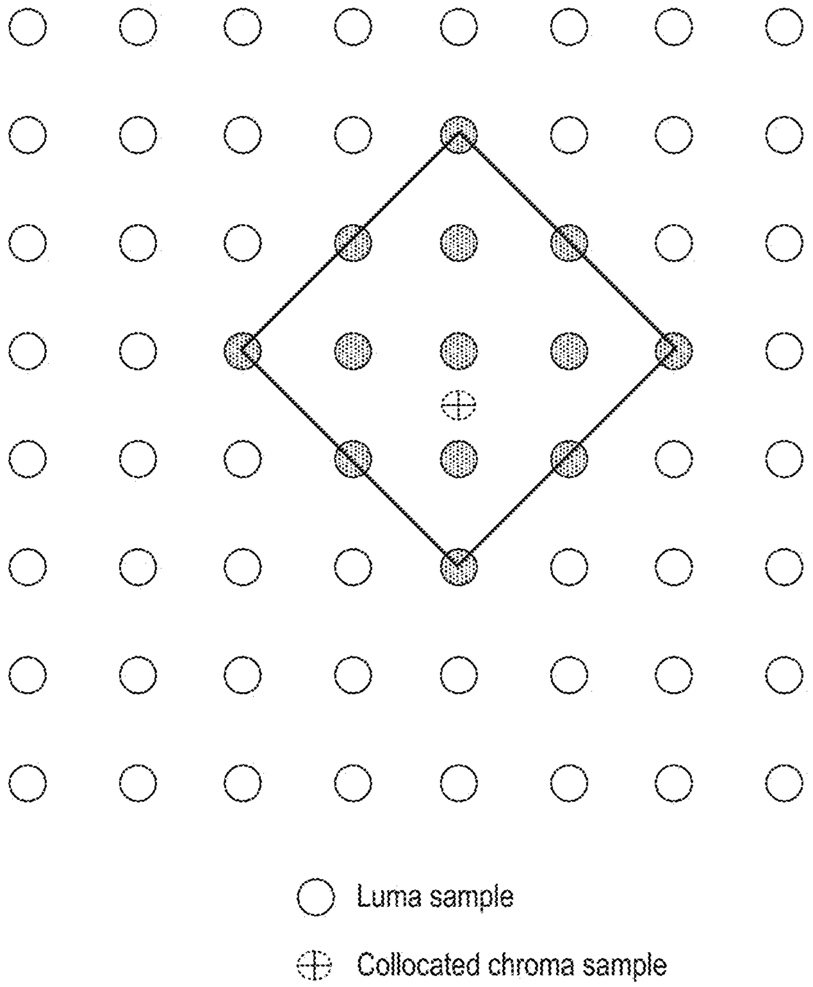
FIG. 18 is a schematic diagram illustrating an exemplary 13-tap diamond shape filter, according to some embodiments of the present disclosure.

The proposed method is not limited to any specific filter shape. For example, FIG. 16 shows a directional cross component filter having an exemplary 9-tap cross shape. FIG. 17 shows a directional cross component filter having an exemplary 9-tap square shape. And FIG. 18 shows a directional cross component filter having an exemplary 13-tap diamond shape. The number of filter taps is defined as the number of luma samples involved in filtering. As an example, blue pixels show the positions of the neighboring filters used in the proposed method. Center position is the collocated luma position of the chroma sample to be filtered.

Assume, (i, j) is the collocated luma position. Then the position of the neighboring samples of the cross-shape filter shown in FIG. 16 can be defined as Table 1 (FIG. 19).

Although the proposed method can be applied independently without existing CDEF process, in the rest of the disclosure, the proposed method is called as cross component CDEF (CC-CDEF) process when it applies in parallel to existing CDEF (as shown in FIG. 12).

According to some embodiments, a sequence level flag is signaled to indicate if the proposed directional cross component filter is enabled for that sequence or not. The semantics of that flag is defined as follows: enable_cccdef equal to 1 specifies that CC-CDEF filtering may be enabled. enable_cccdef equal to 0 specifies that CC-CDEF filtering is disabled for that sequence. When not present, the value of enable_cccdef is inferred to be equal to 0.

The enable_cccdef flag is signaled in the sequence_header_obu syntax when the NumPlanes is greater than 1. If NumPlanes is not greater than 1, there is no chroma component in the sequence and CC-CDEF process is disabled and enable_cccdef flag is inferred to be equal to 0. Table 2 (FIG. 20) shows an exemplary sequence header syntax of the proposed method, in which syntax element 2001 is used to determine whether to signal the enable_cccdef flag based on NumPlanes values.

In some embodiments, the enable_cccdef flag is signaled in the sequence_header_obu syntax when both enable_cdef is equal to 1 and the NumPlanes is greater than 1. If either enable_cdef flag is equal to 0 or NumPlanes is not greater than 1, CC-CDEF process is disabled and enable_cccdef flag is inferred to be equal to 0. Table 3 (FIG. 21) shows an exemplary sequence header syntax of the proposed method, in which syntax element 2101 is used to determine whether to signal the enable_cccdef flag based on both enable_cdef and NumPlanes.

The frame level flag is also signaled to indicate if the proposed CC-CDEF filtering method is enabled for a chroma component of the frame or not. The semantics of these flags are defined as follows: cccdef_frame_enable_flag[i] (i=0 to 1) is equal to 0 indicates that the CC-CDEF process is not enabled for the i-th chroma color component of this frame. The value of i is equal to 0 for Cb component and 1 for Cr color component. cccdef_frame_enable_flag[i] is equal to 1 indicates that the CC-CDEF process may be enabled for the i-th chroma color component of this frame.

The filter coefficients ($w_d$ (x, y) of Eq. 2) of each direction are signaled in the encoded bit-stream. At each frame, encoder collect the statistics from the reconstructed frame and generate the optimized filter coefficients. The generated filter coefficients can be signaled in the frame header under certain condition. For each direction, the number of filter coefficients signaled in the bit-stream is equal to N, where Nis the number of filter taps minus 1 (i.e., N being number of neighboring luma samples of the collocated luma position).

In order to reduce the overhead bit of signaling the filter coefficients, it is also proposed to maintain a history buffer to store the previously decoded filter coefficients. The joint history buffer can be represented as a 4-dimensional array joint_history_buffer[2][M][D][N] where: D=Maximum number of directions. For instance, D=8; M=Maximum number of filter-sets stored in the history buffer. The value of M can be 4, or 8 or 16 or any other positive number. Each filter-set contains (D*N) filter coefficients; N is the number of filter taps minus 1 (i.e. number of neighboring luma samples used for filtering). For instance N=8 in FIG. 16.

Figure 22:
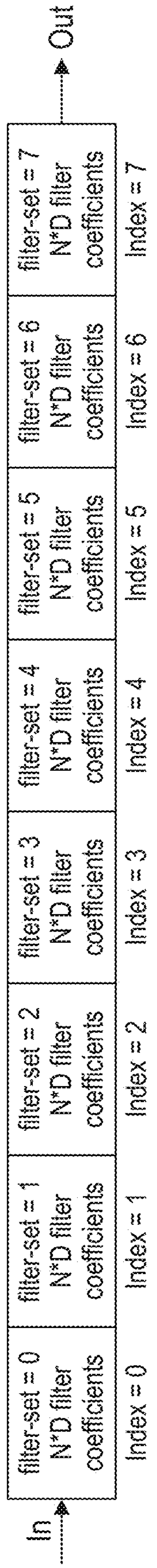
FIG. 22 illustrates an exemplary joint history buffer (joint_history_buffer [0]) for a color component, according to some embodiments of the present disclosure.

The history buffer contains up to M filter-sets (M=8 in the example shown in FIG. 22). For a frame, encoder can signal which filter-set in the history buffer is used. One example of signaling is to signal the index of the filter-set. Either fixed length or variable length code can be used to signal index of the filter-set. If a chroma component of a frame does not use the filter coefficients from the buffer, new filter coefficients are signaled, and the new filter coefficients are inserted to the buffer after decoding that frame. If the history buffer is full, one of the filter-sets is replaced by the new filter-set. One example of replacing filter sets is maintaining first-in-first-out (FIFO) mechanism both in encoder and decoder, where the oldest filter-set is removed before inserting new filter-set. Another example can be encoder signals the index of the filter-set that is to be removed from the history buffer. Other mechanisms of buffer update can be used, for example, the encoder and decoder can maintain a count for each filter set in the buffer, and the least used filter set will be removed such that the new filter set can be inserted. FIG. 22 shows an example of a joint_history_buffer. Each index represents 1 filter-set where, D*N filter coefficients are stored.

At the beginning, the history buffer either can be empty or filled with set of predefined default filter-sets. The default filter coefficients can be generated by offline training and known to both encoder and decoder before starting the encoding/decoding process. The default filter sets can be represented as 4-dimensional array such as default_filter_coeff[2][M][D][N].

Table 4 (FIG. 23) shows the example of the syntax table of the proposed method (Assume, M=8, D=8, and N=8). Syntax element 2302 is implemented to signal the filter coefficients. As shown in Table 4 (FIG. 23), if cccdef_frame_enable_flag[i] is equal to 1, a frame level flag for each chroma color component is signaled to indicate if the filter-set of the history buffer is used or not. The semantics of the proposed flag is given below: cccdef_new_filter_flag[i] (i=0 to 1) is equal to 0 indicates that the CC-CDEF process of the i-th color component of this frame use the filter-sets stored in the joint_history_buffer[i][M][D][N]. The value of i is equal to 0 for Cb component and 1 for Cr color component. cccdef_new_filter_flag[i] is equal to 1 indicates that the CC-CDEF process of the i-th color component of this frame does not use the filter-sets stored in the joint_history_buffer[i][M][D][N].

When cccdef_new_filter_flag[i] is equal to 1, the filter coefficients are signaled in the frame header. The number of filter coefficients signaled is equal to (D*N), where D is the number of directions, N is the number of filter taps minus 1. Assume, D=8 and 9-tap filter described in FIG. 16 is used, then total 64 filter coefficients are signaled. The sign and absolute values of the filter coefficients are signaled separately. The semantics of the filter coefficients syntaxes are given below.

cccdef_filter_coeff abs[i][d][n] indicates the absolute value of the filter coefficient of the n-th neighboring sample of the block associated with direction d. The value of i is equal to 0 for Cb component and 1 for Cr color component.

cccdef_filter_coeff sign[i][d][n] indicates the sign of the filter coefficient of the n-th neighboring sample of the block associated with direction d. cccdef_filter_coeff sign[i][d][n] is equal to 0 means the sign is positive. cccdef_filter_coeff sign[d][n] is equal to 1 means sign is negative. The value of i is equal to 0 for Cb component and 1 for Cr color component.

Either fixed length code or variable length code can use to code cccdef_filter_coeff_abs. If fixed length code is used, the number of bits to signal cccdef_filter_coeff_abs depends on the maximum allowable absolute value of the cccdef_filter_coeff_abs. The maximum allowable value of cccdef_filter_coeff_abs depends on the normalization factor of the filters (i.e., shift1 in Eq. 2). One example of maximum allowable value of cccdef_filter_coeff_abs is 15. A 4-bit fixed length code can be used to signal cccdef_filter_coeff_abs, alternatively, a variable length code (i.e., exponential Golomb code or other variable length code) can also be used to signal cccdef_filter_coeff_abs. An example of the signaling of cccdef_filter_coeff_abs using 4-bit fixed length code is shown in Table 4 (FIG. 23), in which syntax element 2301 is implemented to signal the absolute values cccdef_filter_coeff abs[i][d][n] and signs cccdef_filter_coeff sign[i][d][n] of the filter coefficients. If fixed length code is used, the number of bits to code cccdef_filter_coeff_abs can be computed as follows:

$$\text{coeffBits}=\text{ceil}(\text{Log}_2(\text{maximum cccdef filter coeff value}+1)) \qquad \text{Eq. 6}$$

When cccdef_new_filter_flag[i] is equal to 0, the filter coefficients stored in the joint_history_buffer[i][M][D][N] is used. In this case, encoder can signal which filter-set in the history buffer is used. One example of signaling is to signal the index of the filter-set.

cccdef_filter_set_idx[i](i=0 to 1) indicates the CC-CDEF process of the i-th color component of this frame use cccdef_filter_set_idx[i] th filter-set of the FIFO buffer. The value of i is equal to 0 for Cb component and 1 for Cr color component. The value of cccdef_filter_set idx[i] is 0 to M−1, inclusive, where M is the total number of filter-sets stored in the buffer.

Either fixed length or variable length code can be used to signal index of the filter-set. If fixed length code is used, the number of bits required to signal cccdef_filter_set_idx depends on the total number of available filter-sets in the buffer and can be defined as follows:

$$\text{indexBits}=\text{ceil}(\text{Log}_2 M) \quad \text{Eq. 7}$$

where: M is the number of available filter-sets in the history buffer.

Assume, cccdef_filter_coeff[i][d][n] is the filter coefficient of the n-th neighboring samples of the block with direction d. The value of i is equal to 0 for Cb component and 1 for Cr color component. Assume, cccdef_frame_enable_flag[i] is equal to 1, then, the filter coefficient cccdef_filter_coeff[i][d][n] can be derived as follows:

```
if( cccdef_new_filter_flag[i])
{
  for (d = 0; d < D; i++){
    for (n = 0; n < N; n++){
        cccdef_filter_coeff[i][d][n] = (1 − 2 *
        cccdef_filter_coeff_sign[i][d][n]) *
          cccdef_filter_coeff_abs[i][d][n]
    }
  }
}
else
{
   for (d = 0; d < D; i++){
    for (n = 0; n < N; n++){
      index = cccdef_filter_set_idx[i]
        cccdef_filter_coeff[i][d][n] =
        joint_history_buffer[i][ index][d][n]
      }
    }
}
```

After decoding each frame, if the new filter coefficients are signaled, the history buffer is updated, as follows:

Start encode/decode

Initialize joint_history_buffer to empty or initialize to the default filter sets For each frame in the sequence:

Encode/decode frame

For each chroma color component, i if (cccdef_new_filter_flag[i])

update joint_history_buffer[i][ ][ ][ ] (If the history buffer is full, one of the filter-sets is replaced by the new filter-set. One example of replacing filter sets is maintaining first-in-first-out (FIFO) mechanism both in encoder and decoder, where the oldest filter-set is removed before inserting new filter-set. Another example can be encoder can signal index of the filter-set need to be removed. A third example can be the least-used filter set in the buffer is removed)

In some embodiments, a separate history buffer is maintained for each direction. The proposed method supports any number of directions and is not limited to any specific number of directions. If 8 directions are supported, then 8 separate buffers are maintained for each color component. All of the syntax elements are signaled separately for each direction.

The separate history buffer can also be represented as a 4-dimensional array sep_history_buffer[2][D][$M_d$][$N_d$] where: D=Maximum number of directions. For instance, D=8; $M_d$=Maximum number of filter-sets stored in the history buffer for direction d. The value of $M_d$ can be 4, or 8 or 16 or any other positive number. Each filter-set contains $N_d$ filter coefficients. The value of $M_d$ can be same or different for each direction; $N_d$ is the number of filter taps minus 1 for direction d. The value of $N_d$ can be same or different for each direction. For instance $N_d$=8 in FIG. 24 for all directions.

Figure 24:
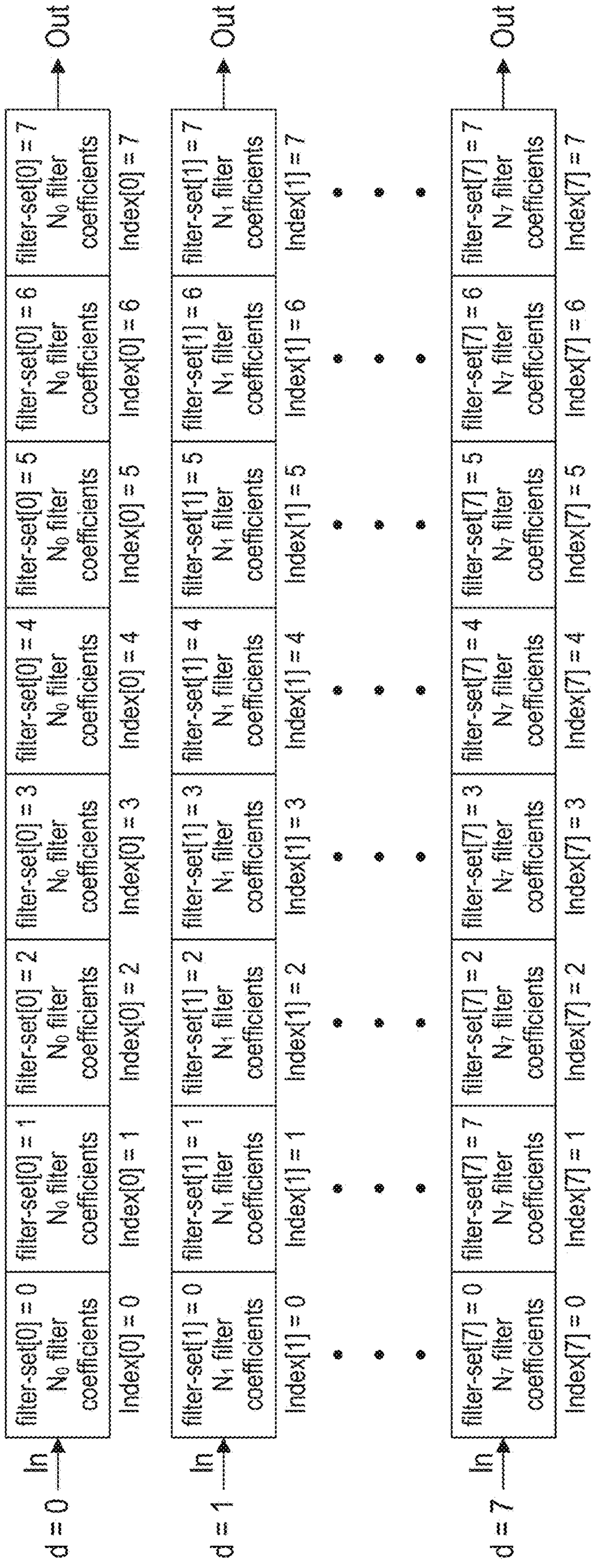
FIG. 24 illustrates separate history buffer for each direction, according to some embodiments of the present disclosure.

The separate history buffer contains up to $M_d$ filter-sets ($M_d$=8 in the example shown in FIG. 24) for direction d. For a given direction, encoder can signal which filter-set in the history buffer is used. One example of signaling is to signal the index of the filter-set of each direction. Either fixed length or variable length code can be used to signal index of the filter-set. An index of the filter-set is signaled for each direction if the filter-set in buffer is used for filtering. If a chroma component associated with a given direction of a frame does not use the filter coefficients from the buffer, the new filter coefficients are inserted to the buffer for that direction after decoding that frame. If the history buffer is full, one of the filter-sets is replaced by the new filter-set. One example of replacing filter sets is maintaining first-in-first-out (FIFO) mechanism both in encoder and decoder, where the oldest filter-set is removed before inserting new filter-set. Another example can be encoder can signal index of the filter-set need to be removed. A third example is to maintain usage count of each filter set, and to remove the least used filter set in the buffer. FIG. 24 shows an example of 8 separate buffers for 8 directions. Each index represents 1 filter-set where ($N_d$) is the filter coefficients for a direction d.

Similar to the above described embodiments, at the beginning, the history buffer for a given direction can be initialized to either empty or can be filled with predefined set of default filters. The default filter coefficients are generated by offline training and known to both encoder and decoder before starting the encoding/decoding process. The default filter sets can be represented as 4-dimensional array such as default_filter_coeff[2][$M_d$][D][$N_d$].

Table 5 (FIG. 25) shows the syntax table of the proposed method. Syntax element 2501 is implemented to signal the filter coefficients. As shown in Table 5 (FIG. 25), if cccdef_frame_enable_flag[i] is equal to 1, additional flag is signal to indicate if the proposed method is enabled for a specific direction or not. The semantics of the proposed flag is defined as follows: cccdef_direction_enable_flag [i][d] (i=0 to 1) is equal to 0 indicates that the CC-CDEF process is not enabled for the blocks with direction equal to d of the i-th chroma color component of this frame. The value of i is equal to 0 for Cb component and 1 for Cr color component. cccdef_direction_enable_flag [i][d] is equal to 1 indicates that the CC-CDEF process may be enabled for the blocks with direction equal to d of the i-th chroma color component of this frame.

If the value cccdef_direction_enable_flag [i][d] is equal to 1, an additional flag is signaled to indicate if the filter-set of the history buffer is used or not for that particular direction. The semantics of the proposed flag is given below: cccdef_new_filter_flag[i][d] (i=0 to 1) is equal to 0 indicates that the CC-CDEF process of the blocks associated with the direction d of the i-th color component of this frame uses the filter-sets stored in the sep_history_buffer[i][d][ ][ ] buffer. The value of i is equal to 0 for Cb component and 1 for Cr color component. cccdef_new_filter_flag[i][d] is equal to 1 indicates that the CC-CDEF process of the blocks associated with the direction d of i-th color component of this frame does not use the filter-sets stored in the sep_history_buffer [i][d][ ][ ] buffer.

When cccdef_new_filter_flag[i][d] is equal to 1, the filter coefficients are signaled in the frame header. The number of filter coefficients singled is equal to Na, where Na is the number of filter taps minus 1. Assume, 9-tap filter described in FIG. 16 is used, then total 8 filter coefficients are signaled for that direction. The sign and absolute values of the filter coefficients are signaled separately.

cccdef_filter_coeff abs[i][d][n] indicates the absolute value of the filter coefficient of n-th neighboring sample of the block associated with direction d. The value of i is equal to 0 for Cb component and 1 for Cr color component.

cccdef_filter_coeff sign[i][d][n] indicates the sign of the filter coefficient of n-th neighboring sample of the block associated with direction d. cccdef_filter_coeff sign[i][d][m] is equal to 0 means the sign is positive. cccdef_filter_coeff sign[d][m] is equal to 1 means sign is negative. The value of i is equal to 0 for Cb component and 1 for Cr color component.

Either fixed length code or variable length code can be used to code cccdef_filter_coeff abs[i][d][n]. If fixed length code is used, the number of bits to signal cccdef_filter_coeff abs[i][d][n] depends on the maximum allowable absolute value of the cccdef_filter_coeff_abs. The maximum allowable value of cccdef_filter_coeff_abs depends on the normalization factor of the filters (i.e., shift1 of Eq. 2). One example of maximum allowable value of cccdef_filter_coeff_abs is 15. A 4-bit fixed length code can be used to signal cccdef_filter_coeff_abs, alternatively, a variable length code (i.e. exponential Golomb code or other variable length code) code can also be used to signal cccdef_filter_coeff_abs. An example of the signaling of cccdef_filter_coeff_abs using 4-bit fixed length code is shown in Table 5 (FIG. 25). If fixed length code is used, the number of bits to code cccdef_filter_coeff_abs can be computed as follows:

$$coeffBits_d = \text{ceil}(\text{Log}_2(\text{max cccdef filter coeff value}+1)) \quad \text{Eq. 8}$$

When cccdef_new_filter_flag[i][d] is equal to 0, the filter coefficients stored in the history sep_history_buffer[i][d][ ][ ] is used. In this case the index of the filter-set is signaled.

cccdef_filter_set_idx[i][d](i=0 to 1) indicates the CC-CDEF process of the blocks associated with direction d of the i-th color component of this frame use cccdef_filter_set idx[i][d] th filter-set of the FIFO buffer sep_history_buffer [i][d][ ][ ]. The value of i is equal to 0 for Cb component and 1 for Cr color component. The value of cccdef_filter_set idx[i][d] is 0 to M−1, inclusive, where M is the total number of filter-sets stored in the buffer.

Either fixed length or variable length code can be used to signal index of the filter-set. If fixed length code is used, the number of bits required to signal cccdef_filter_set_idx depends on the total number of available filter-sets in the buffer and can be defined as follows:

$$indexBits_d = \text{ceil}(\text{Log}_2 M_d) \quad \text{Eq. 9}$$

where, $M_d$ is the number of available filter-sets in the history buffer of direction d.

Assume, cccdef_filter_coeff[i][d][n] is the filter coefficient of the n-th neighboring samples of the block with direction d. The value of i is equal to 0 for Cb component and 1 for Cr color component. Assume, cccdef_direction_enable_flag [i][d] is equal to 1, and $N_d$ is the number of filter taps minus 1 for direction d then, the filter coefficient cccdef_filter_coeff[i][d][n] of a direction dis derived as follows:

```
if( cccdef_new_filter_flag[i][d])
{
    for (n = 0; n < N_d; i++)
    {
        cccdef_filter_coeff[i][d][n] = (1 - 2 *
        cccdef_filter_coeff_sign[i][d][m]) *
            cccdef_filter_coeff_abs[i][d][n]
    }
}
else
{
    for (n = 0; n < N_d; n++)
    {
        cccdef_filter_coeff[i][d][n] =
          sep_history_buffer[i][d][
          cccdef_filter_set_idx[i][d] ][n]
    }
}
```

After decoding each frame, if the new filter coefficients are signaled, the history buffer is updated, as follows:

Start encode/decode

Initialize sep_history_buffer to empty or set to default filter sets

For each frame in the sequence:

Encode/decode frame

For each chroma color component, i

For each direction d if (cccdef_new_filter_flag[i][d])

update sep_history_buffer[i][d][ ][ ] (If the history buffer is full, one of the filter-sets is replaced by the new filter-set. One example of replacing filter sets is maintaining first-in-first-out (FIFO) mechanism both in encoder and decoder, where the oldest filter-set is removed before inserting new filter-set. Another example can be encoder can signal index of the filter-set need to be removed. A third example is the least used filter set in the buffer is removed.)

In some embodiments, no history buffer is maintained. A set of default filters are pre-defined in both encoder and decoder. Encoder signal to the decoder if the pre-defined default filter set is used or not. If the pre-defined default filters are not used, the filter coefficients are signaled for that frame and used in the encoding/decoding.

In the above described embodiments, the filter coefficients (cccdef_filter_coeff abs[i][d][n]) are explicitly signaled to the decoder when new filter flags are enabled. In this disclosure, in one embodiment, fixed length coding is used to code the syntax element cccdef_filter_coeff abs[i][d][n]. When fixed length code is used the number of bits require to signal a filter coefficient depend on the maximum allowable value. If fixed length code is used, the number of bits to code cccdef_filter_coeff_abs can be computed as Eq. 6 and Eq. 8.

In some embodiments, cccdef_filter_coeff abs[i][d][n] is coded by using exponential-Golomb code. Still in another embodiment, truncated unary code followed by exponential-Golomb code is used to signal cccdef_filter_coeff_abs[i][d][n].

At the beginning of the encoding/decoding, the history buffer is either empty or can be filled with the default filter coefficients. In order to maintain the random access capability, the history buffer can be refreshed at the starting of the encoding/decoding of each key-frame/intra frame.

By combining with the above-described embodiments, the proposed refreshing method can be described as follows:

Start encode/decode
Initialize sep_history_buffer either to empty or default filters
For each frame in the sequence:
  if frame is key frame/Intra frame
    Refresh the sep_history_buffer
  Encode/decode frame
  For each chroma color component, i
    For each direction d
      if (cccdef_new_filter_flag[i][d])
        update sep_history_buffer[i][d][ ][ ]

In one example, the history buffer is empty at the beginning of the encoding/decoding of the sequence. Before decoding/encoding of each I frame, all elements of the history buffer are removed.

In another example, the history buffer is filled with predefined set of default filters at the beginning of the encoding/decoding of the sequence. Before decoding/encoding of each I frame, the buffer is re-initialized to the default filters.

In another example, there are multiple set of default filters are known to both encoder and decoder. The encoder can signal to the decoder which default filter sets is used to fill the buffer during refresh. One example of signaling is to signal index of the default filter set in the sequence level. Another example of signaling is to signal the index of the default filter set in each key-frame.

In another example, a frame level flag is signaled at the bit-stream to indicate if the buffer is to initialize for that frame or not.

ccdef_history_buffer_initialize_flag indicates that the FIFO history buffer of the filter coefficients need to initialize at the beginning of the decoding of the frame.

Following is the buffer refreshing procedure with the frame level flag.

Start encode/decode
Initialize sep_history_buffer to empty or default filter sets
For each frame in the sequence:
  if ccdef_history_buffer_initialize_flag
    Refresh the sep_history_buffer
  Encode/decode frame
  For each chroma color component, i
    For each direction d
      if (cccdef_new_filter_flag[i][d])
        update sep_history_buffer[i][d][ ][ ]

Table 6 (FIG. 26) shows an exemplary syntax table, which is similar to the syntax table in FIG. 25 but includes an additional syntax element 2601 for signaling ccdef_history_buffer_initialize_flag.

The proposed method is not limited to any fixed number of directions. In one example, the number of directions can be signaled in the sequence header. In another example, the number of directions can be varied frame by frame and can be signaled in the frame header. In another example, encoder can signal the index value of the supported predefined directions. For example, assume two number of directions (1 or 4) are allowed for a given sequence. In that case, for each frame, encoder can signal a flag to the decoder to indicate either one or four directions are used for that given frame.

In some embodiments, the filter strength may be signaled. One exemplary method allows block level control of the strengths of the filtering process. The supported strength values are predefined in the encoder/decoder. One example of the supported strength values is as follows: allowed_strength_array=[0, 1, 2, 4]

In order to control the strength, the proposed method at first signals the sub-set of the allowed_strength_array in the frame header. An index is signaled at each filter block level (for example, 64×64 filter block) to indicate which strength values are used for that specific filter block.

In the frame header, the proposed method signals a sub-set of the allowed_strength_array[ ]. If the value of cccdef_frame_enable_flag[ ] is equal to 1, at first the number of elements in the sub-set is signaled, followed by the values of the element. If cccdef_frame_enable_flag[ ] is equal to 0, no strength parameters are signaled because CC-CDEF process is disabled for that frame.

The following are the semantics of the syntax elements related to strength values in the frame header.

cccdef_bits [i](i=0 to 1) indicates the number of strengths (1<<cccdef_bits [i]) signaled in the frame header. The number of strengths of a frame is equal to 1<<cccdef_bits [i]. The value of cccdef_bits[i] is 0 to N, inclusive. For example, N=2.

ccdef_strength_idx[i][k] (i=0 to 1) indicates the index of the allowed_strength_array[ ] of the i-th color component of this frame. The value of k is 0 to (1<<cccdef_bits [i]−1), inclusive.

The syntax element cccdef_bits can be coded either fixed length or variable length code. If the fixed length code is used, the number of bits to code cccdef_bits syntax depends on the total number of elements in the allowed_strength_array. For example, if the number of elements of allowed_strength_array is 4, then number of bits ($N_{bits\text{-}cccdef\text{-}bits}$) to code cccdef_bits is 2.

The syntax element ccdef_strength_idx can also be coded either fixed length or variable length code. If the fixed length code is used, the number of bits to code ccdef_strength_idx syntax depends on the total number of elements available in the allowed_strength_array. For example, if the number of elements of allowed_strength_array is 4, then number of bits ($N_{bit\text{-}ccdef\_strength\_idx}$) to code ccdef_strength_idx is 2.

Table 7 (FIG. 27) shows an exemplary frame header syntax table, in which syntax element 2701 shows the ccdef_strength_idx syntax embedded in a syntax for filter coefficient signaling using joint_history_buffer. Moreover, Table 8 (FIG. 28) shows an exemplary frame header syntax table, in which syntax element 2801 shows the ccdef_strength_idx syntax embedded in a syntax for filter coefficient signaling using separate history buffers.

In the frame header, the proposed method signals a list of strength values. Each filter-block can select one of the strength values signaled in the frame header. The index of the strength is signaled at every 64×64 filter block. The index values are signaled after CDEF parameter signaling. Table 9 (FIG. 29), Table 10 (FIG. 30) and Table 11 (FIG. 31) show the syntax change of the proposed method as compared to AV1 specification. Specifically, Table 9 (FIG. 29) shows an intra_frame_mode_info( ) syntax table being modified to include a syntax element 2901 for retrieving parameters used by the disclosed directional cross component filter. Table 10 (FIG. 30) shows an inter_frame_mode_info( ) syntax table being modified to include syntax element 3001 for retrieving parameters used by the disclosed directional cross component filter. And syntax element 3101 in Table 11 (FIG. 31) shows an exemplary block level filter syntax table for reading the parameters used by the disclosed directional cross component filter, including a new cccdef_idx syntax element 3101 used for signaling the index of the strength value of a filter block. The semantics of the cccdef_idx syntax are defined as follows.

cccdef_idx specifies the index of the strength value used for CC-CDEF filtering process. A value of 0 means that CC-CDEF is disabled for that block.

In the decoder side (also in the encoder) once all of the filter coefficients and filter strengths are available, the CC-CDEF filtering process can be performed in the following steps:

For a given chroma block
  Extract the strength value as follows:
    strength=cccdef_strength_array_frame[ ][cccdef_idx[ ][ ]]
  if (strength)
    Extract direction d from the corresponding luma block from the CDEF process
    For each pixel position (p, q) of the chroma block
      Find the collocated luma position (x, y)
      A variable offset is derived as follow (assume cross shape filter described in the FIG. 16).

offset=cccdef_filter_coeff[ ][*d*][0]*(rec*Y*(*x*−2,*y*)−rec*Y*(*x*,*y*))+cccdef_filter_coeff[ ][*d*][1]*(rec*Y*(*x*−1,*y*)−rec*Y*(*x*,*y*))+cccdef_filter_coeff[ ][*d*][2]*(rec*Y*(*x*,*y*−2)−rec*Y*(*x*,*y*))+cccdef_filter_coeff[ ][*d*][3]*(rec*Y*(*x*,*y*−1)−rec*Y*(*x*,*y*))+cccdef_filter_coeff[ ][*d*][4]*(rec*Y*(*x*,*y*+1)−rec*Y*(*x*,*y*))+cccdef_filter_coeff[ ][*d*][5]*(rec*Y*(*x*,*y*+2)−rec*Y*(*x*,*y*))+cccdef_filter_coeff[ ][*d*][6]*(rec*Y*(*x*+1,*y*)−rec*Y*(*x*,*y*))+cccdef_filter_coeff[ ][*d*][7]*(rec*Y*(*x*+2,*y*)−rec*Y*(*x*,*y*))+ offset=(offset+roundFactor1)>>shift1 offset=(offset*strength+roundFactor2)>>shift2;

$\text{rec}C_{cccdef}(p,q)=\text{rec}C_{cdef}(p,q)+\text{offset}$

An example of the CC-CDEF filtering process is given below. Here it is assumed that shift1=6, shift2=2, and 9-tap cross-shape filter shown in FIG. 16 is used for filtering.

The input values to this process include but are not limited to: (a) a variable plane specifying which plane is being predicted; (b) variables r and c specifying the location of an 8×8 block in units of 4×4 blocks in the luma plane; (c) a variable strength specifying the index of the filter strength; (d) a variable dir specifying the detected direction of the block; (e) the array CurrFrame of reconstructed samples after deblocking; (f) the array CdefFrame of reconstructed samples after CDEF; (g) the array cccdef_filter_coeff[plane][dir][ ] containing filter coefficients; and (h) the syntax cccdef_direction_enable_flag[plane][dir] which contains direction enable flag.

Output from this process is the modified array CdefFrame containing CC-CDEF samples. The process modifies samples in CdefFrame based on filtering samples from CurrFrame.

MiColStart, MiRowStart, MiColEnd, MiRowEnd are set equal to the values they had when the syntax element MiSizes[r][c] was written. The detail definition of the variables MiColStart, MiRowStart, MiColEnd, MiRowEnd can be found in AV1 specification.

if (cccdef_direction_enable_flag[plane][dir]==0 strength==0), no filtering is applied and the process is return;

Otherwise, the filtering is applied as follows.

```
subX = subsampling_x
subY = subsampling_y
p0 = (c * MI_SIZE ) >> subX
q0 = (r * MI_SIZE ) >> subY
x0 = p0 << subX
y0 = q0 << subY
```

-continued

```
w = 8 >> subX
h = 8 >> subY
offx[8] = [−2, −1, 0, 0, 0, 0, 1, 2]
offx[y] = [0, 0, −2, −1, +1, +2, 0, 0]
for ( i = 0; i < h; i++ ) {
  for ( j = 0; j < w; j++ ) {
    sum = 0
    x = (p0 + j ) << subX
    y = (q0 + j) << subY
    curr_luma = CurrFrame[0] [x][y]
    for ( k = 0; k < 8; k++ ) {
      candidateR = (x + offx[k]) >> MI_SIZE_LOG2
      candidateC = (y + offy[k])>> MI_SIZE_LOG2
      if ( is_inside_filter_region(candidateR, candidateC)) {
        sum += cccdef_filter_coeff[plane][dir][k] *
          (CurrFrame[0][x + offx[k]][y + offy[k]] − curr_luma)
        }
    }
    offset = ((sum + 32) >> 6;
    offset = (offset * strength + 2) >> 2;
    filtered_pel = CdefFrame[plane][p0 + i] [q0 + j] + offset;
    CdefFrame[plane][p0 + i][q0 + j] = Clip3(min, max, filtered_pel)
  }
}
```

Figure 32:
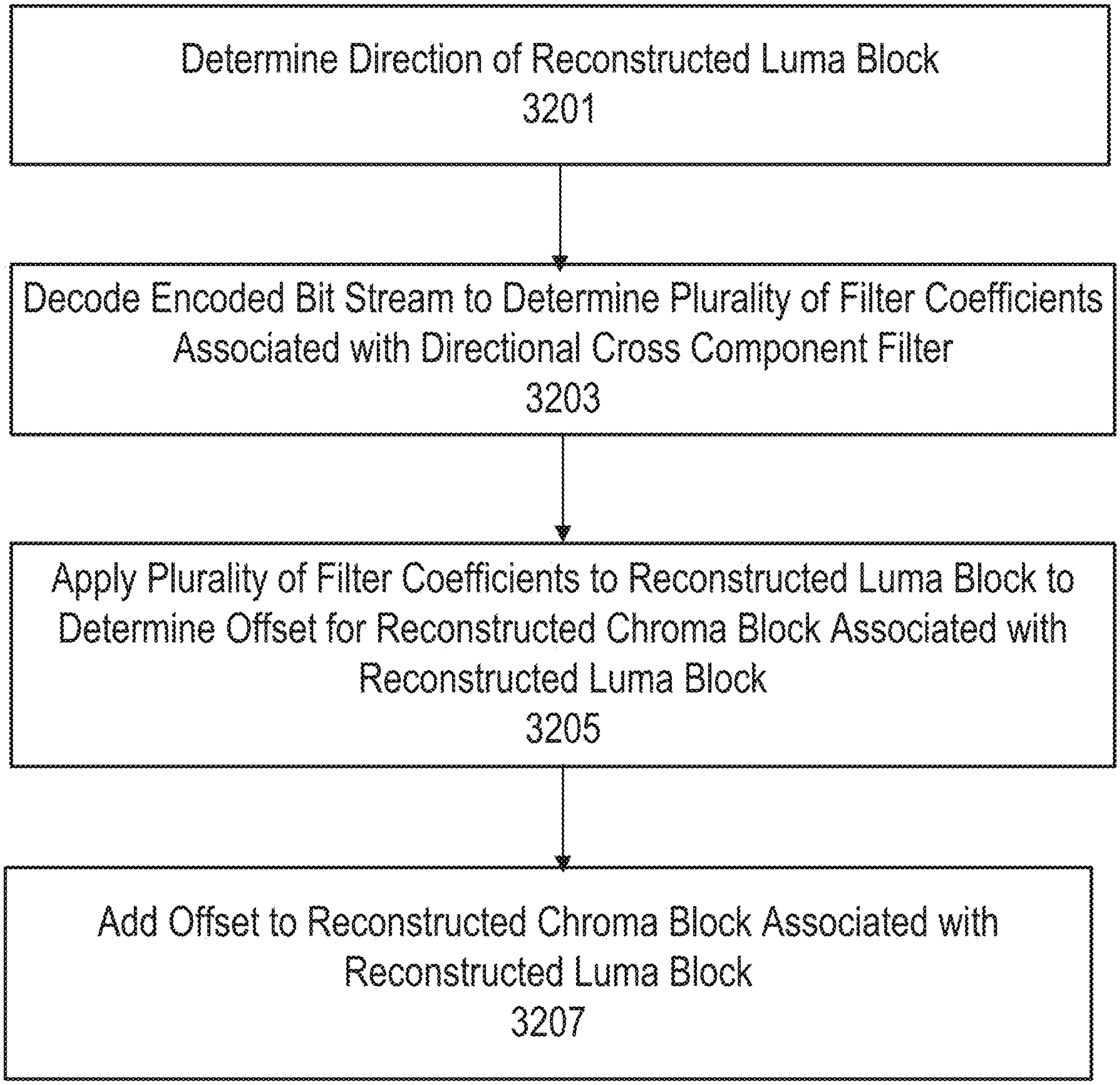
FIG. 32 illustrates a flow chart of an example method for decoding a video bitstream, according to some embodiments of present disclosure.

FIG. 32 illustrates a flow chart of an example method 3200 for decoding a video bit stream, according to some embodiments of the present disclosure. Method 3200 can be performed by a decoder (e.g., by process 300A of FIG. 3A or 300B of FIG. 3B), or performed by one or more software or hardware components of an apparatus (e.g., apparatus 400 of FIG. 4). For example, a processor (e.g., processor 402 of FIG. 4) can perform method 3200. In some embodiments, method 3200 can be implemented by a computer program product, embodied in a computer-readable medium, including computer-executable instructions, such as program code, executed by computers (e.g., apparatus 400 of FIG. 4).

Consistent with the disclosed embodiments, the decoder may perform method 3200 to determine an offset to a direction of a reconstructed luma block, and use the offset to perform directional filtering of a collocated reconstructed chroma block. In some embodiments, method 3200 may be performed in parallel to a loop restoration unit, in parallel to a constraint directional enhancement filter, after the loop restoration unit is applied to the reconstructed luma block, or after the constraint directional enhancement filter is applied to the reconstructed luma block. Referring to FIG. 32, method 3200 may include the following steps 3201-3207.

In step 3201, the decoder may determine a direction of a reconstructed luma block. In some embodiments, the decode may determine the direction by applying a constraint directional enhancement filter (CDEF) to the reconstructed luma block.

In step 3203, the decoder may decode an encoded bit stream to determine a plurality of filter coefficients associated with a directional cross component filter. For example, the directional cross component filter may be a 9-tap cross shaped filter, a 9-tap square shaped filter, and a 13-tap diamond shaped filter.

In some embodiments, the decoder may determine, based on a flag signaled in the encoded bit stream, whether the directional cross component filter is enabled for a video sequence or a video frame. The flag may be signaled in a sequence header or a video frame header.

In some embodiments, a history buffer may be used to store one or more sets of filter coefficients. The decoder may decode the encoded bit stream to determine an index pointing to a set of filter coefficients stored in the history buffer.

The decoder may then retrieve the set of filter coefficients from the history buffer based on the index.

In some embodiments, the set of filter coefficients may be directly signaled in the encoded bit stream, without using the history buffer. Accordingly, the decoder may decode the encoded bit stream and extract the set of filter coefficients.

In step 3205, the decoder may apply the plurality of filter coefficients to the reconstructed luma block to determine an offset for a reconstructed chroma block associated with the reconstructed luma block. In some embodiments, for each chroma sample, the plurality of filter coefficients may be applied to a collocated luma sample of the chroma sample, and one or more neighboring luma samples of the collocated luma sample.

In some embodiments, the reconstructed chroma block includes at least two chroma components, and the determining of the offset includes determining an offset associated with each of the at least two chroma components. For example, the reconstructed chroma block may have a Cb component and a Cr component.

In step 3207, the decoder may add the offset to the reconstructed chroma block associated with the reconstructed luma block. In some embodiments, the decoder may decode the encoded bit stream to determine a strength level associated with the offset and apply the offset to the reconstructed chroma block at the strength level.

Figure 33:
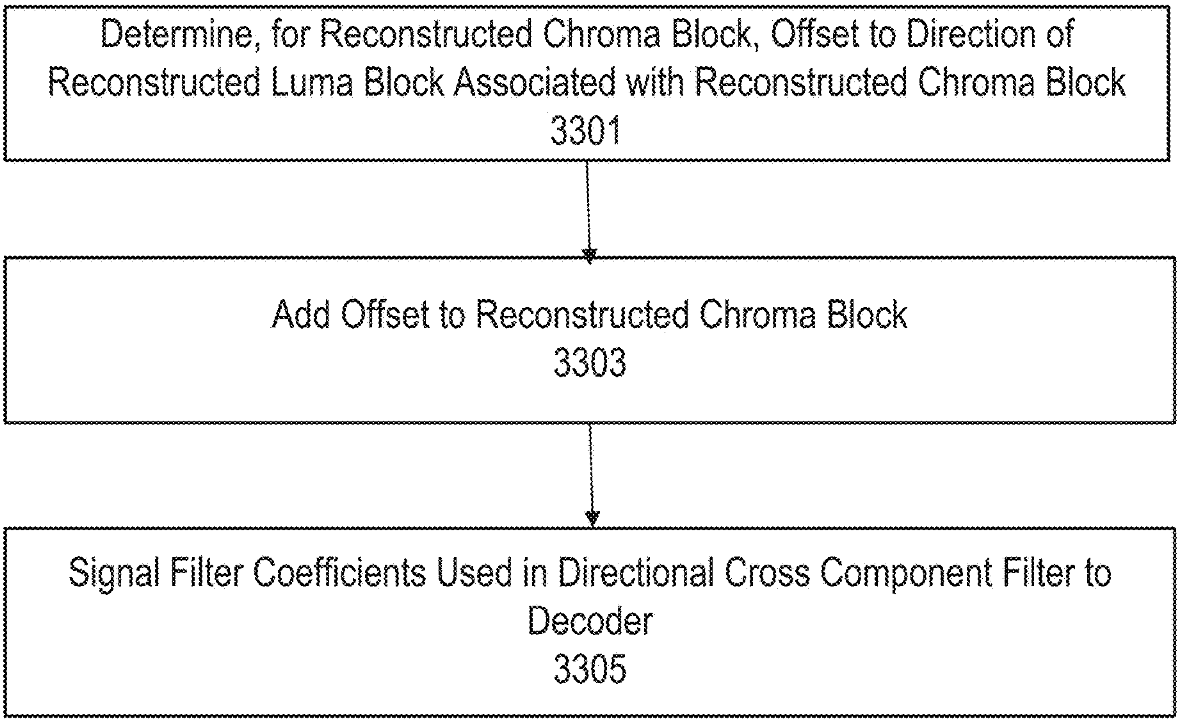
FIG. 33 illustrates a flow chart of an example method for encoding a video sequence, according to some embodiments of the present disclosure.

FIG. 33 illustrates a flow chart of an example method 3300 for encoding a video sequence, according to some embodiments of the present disclosure. Method 3300 can be performed by an encoder (e.g., by process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 3300. In some embodiments, method 3300 can be implemented by a computer program product, embodied in a computer-readable medium, including computer-executable instructions, such as program code, executed by computers (e.g., apparatus 400 of FIG. 4).

Consistent with the disclosed embodiments, the encoder may perform method 3300 to determine an offset to a direction of a reconstructed luma block and use the offset to perform directional filtering of a collocated reconstructed chroma block. In some embodiments, method 3300 may be performed in parallel to a loop restoration unit, in parallel to a constraint directional enhancement filter, after the loop restoration unit is applied to the reconstructed luma block, or after the constraint directional enhancement filter is applied to the reconstructed luma block. Referring to FIG. 33, method 3300 may include the following steps 3301-3305.

In step 3301, the encoder may determine, for a reconstructed chroma block, an offset to a direction of a reconstructed luma block associated with the reconstructed chroma block. In some embodiments, the determining of the offset includes applying a directional cross component filter to the reconstructed luma block. Specifically, for each chroma sample in the chroma block, the encoder may apply a plurality of filter coefficients associated with the directional cross component filter to: a collocated luma sample of the chroma sample, and one or more neighboring luma samples of the collocated luma sample. For example, the directional cross component filter may be a 9-tap cross shaped filter, a 9-tap square shaped filter, or a 13-tap diamond shaped filter.

In some embodiments, the reconstructed chroma block includes at least two chroma components, and the determining of the offset includes determining an offset associated with each of the at least two chroma components. For example, the reconstructed chroma block may have a Cb component and a Cr component.

In step 3303, the encoder may add the offset to the reconstructed chroma block. Specifically, the encoder may apply the offset to the reconstructed chroma block at a strength level. The encoder may signal the strength level to a decoder in communication with the encoder.

In step 3305, the encoder may signal the filter coefficients used in the directional cross component filter to the decoder. In some embodiments, the encoder and decoder may use a history buffer to store coefficients used in the directional cross component filter. Accordingly, for each filtered reconstructed chroma block, the encoder may signal, in a bit stream, an index pointing to a set of filter coefficients stored in the history buffer.

In some embodiments, the encoder may signal the set of filter coefficients in the bit stream directly, without using the history buffer. In an exemplary embodiment, each filter coefficient has an absolute value and a sign, and the encoder may signal the absolute value and sign separately.

The embodiments may further be described using the following clauses:

1. A video encoding method, comprising:
   determining, for a reconstructed chroma block, an offset to a direction of a reconstructed luma block associated with the reconstructed chroma block, and
   adding the offset to the reconstructed chroma block,
   wherein the determining of the offset comprises applying a directional cross component filter to the reconstructed luma block.
2. The method according to clause 1, wherein:
   the reconstructed luma block comprises one or more luma samples,
   the reconstructed chroma block comprises one or more chroma samples, and
   applying the directional cross component filter to the reconstructed luma block comprises applying the directional cross component filter to:
   a collocated luma sample of a chroma sample, and
   one or more neighboring luma samples of the collocated luma sample.
3. The method according to clause 1, wherein one or more strength levels are associated with the directional cross component filter, and the offset is added to the reconstructed chroma block at one of the one or more strength levels.
4. The method according to clause 1, wherein:
   the reconstructed chroma block comprises at least two chroma components, and
   the determining of the offset comprises determining an offset associated with each of the at least two chroma components.
5. The method according to clause 4, wherein the at least two chroma components comprises a Cb component and a Cr component.
6. The method according to clause 1, wherein the directional cross component filter is applied:
   in parallel to a loop restoration unit,
   in parallel to a constraint directional enhancement filter,
   after the loop restoration unit is applied to the reconstructed luma and chroma blocks, or
   after the constraint directional enhancement filter is applied to the reconstructed luma and chroma blocks.
7. The method according to clause 1, wherein the directional cross component filter comprises one or more of a 9-tap cross shaped filter, a 9-tap square shaped filter, or a 13-tap diamond shaped filter.

8. The method according to clause 1, further comprising: signaling, in a bit stream, a first flag indicating whether the directional cross component filter is enabled for a video sequence or a video frame 9. The method according to clause 8, further comprising: determining whether to signal the first flag, based on whether the video sequence or video frame comprises chroma components, wherein the first flag is not signaled if the video sequence or video frame does not comprise chroma signals.

10. The method according to clause 8, further comprising: determining whether to signal the first flag, based on whether a constraint directional enhancement filter (CDEF) is enabled for the video sequence or video frame, wherein the first flag is not signaled if the CDEF is disabled.

11. The method according to clause 8, wherein the first flag is signaled in a video sequence header or a video frame header.

12. The method according to clause 1, further comprising: signaling, in a bit stream, an index pointing to a set of filter coefficients stored in a buffer, the set of filter coefficients being used in the directional cross component filter to determine the offset.

13. The method according to clause 12, further comprising:
updating the buffer to include one or more sets of filter coefficients associated with the directional cross component filter.

14. The method according to clause 12, further comprising:
signaling, in the bit stream, a flag associated with a chroma component of a video sequence, the flag indicating whether directional cross component filtering associated with the chroma component uses filter coefficients stored in the buffer.

15. The method according to clause 14, further comprising:
in response to the directional cross component filtering associated with the chroma component does not use filter coefficients stored in the buffer, signaling, in a bit stream, a set of filter coefficients used in the directional cross component filter.

16. The method according to clause 15, wherein each filter coefficient in the set of filter coefficients comprises an absolute value and a sign, and signaling the set of filter coefficients further comprises:
signaling a separate indicator for each of the absolute values and signs.

17. The method according to clause 12, wherein the direction of the reconstructed luma block is one of a plurality of directions, and a plurality of buffers are used for storing filter coefficients for performing directional cross component filtering on the plurality of directions, respectively.

18. The method according to clause 17, further comprising:
signaling, in a bit stream, a first flag indicating whether the directional cross component filter is enabled for a first direction.

19. The method according to clause 19, further comprising:
signaling, in the bit stream, a second flag indicating whether directional cross component filtering associated with the first direction uses the filter coefficients stored in a buffer associated with the first direction.

20. The method according to clause 1, further comprising: in response to a video frame associated with the reconstructed chroma block being a key frame or an intra frame, initiating the buffer.

21. The method according to clause 20, wherein initiating the buffer comprises:
emptying the buffer, or
setting filter coefficients stored in the buffer to predetermined values.

22. The method according to clause 20, further comprising:
signaling a flag for initiating the buffer.

23. The method according to clause 1, wherein the offset is applied to the reconstructed chroma block at a strength level, and the method further comprises:
signaling, in a bit stream, indicators of one or more strength levels allowed for a chroma component of a video frame, and signaling, in the bit stream, a flag indicating a quantity of the one or more strength levels.

24. The method according to clause 23, wherein the indicators of the one or more strength levels comprise an index pointing to a strength level in a set of predetermined strength levels.

25. The method according to clause 23, further comprising:
signaling, in the bit stream, an index pointing to one of the one or more strength levels, the index being associated with a block of the video frame.

26. A video decoding method, comprising:
determining a direction of a reconstructed luma block;
decoding an encoded bit stream to determine a plurality of filter coefficients associated with a directional cross component filter; and
applying the plurality of filter coefficients to the reconstructed luma block to determine an offset to the direction of the reconstructed luma block.

27. The method according to clause 26, further comprising:
adding the offset to a reconstructed chroma block associated with the reconstructed luma block.

28. The method according to clause 27, wherein adding the offset to the reconstructed chroma block comprises:
decoding the encoded bit stream to determine a strength level associated with the offset; and
adding the offset to the reconstructed chroma block at the strength level.

29. The method according to clause 28, wherein the strength level is a positive integer.

30. The method according to clause 28, wherein the index is signaled in coding parameters for a filter block.

31. The method according to clause 30, wherein the filter block is a 64×64 block.

32. The method according to clause 27, wherein:
the reconstructed luma block comprises one or more luma samples,
the reconstructed chroma block comprises one or more chroma samples, and
applying the plurality of filter coefficients to the reconstructed luma block to determine the offset comprises applying the plurality of filter coefficients to:
a collocated luma sample of a chroma sample, and
one or more neighboring luma samples of the collocated luma sample.

33. The method according to clause 27, wherein:
the reconstructed chroma block comprises at least two chroma components, and
the determining of the offset comprises determining an offset associated with each of the at least two chroma components.
34. The method according to clause 33, wherein the at least two chroma components comprises a Cb component and a Cr component.
35. The method according to clause 26, wherein the direction of the reconstructed luma block is determined by performing a constraint directional enhancement filter (CDEF) to the reconstructed luma block.
36. The method according to clause 26, wherein the offset is determined:
in parallel to a loop restoration unit,
in parallel to a constraint directional enhancement filter,
after the loop restoration unit is applied to the reconstructed luma block, or
after the constraint directional enhancement filter is applied to the reconstructed luma block.
37. The method according to clause 26, wherein the directional cross component filter comprises one or more of a 9-tap cross shaped filter, a 9-tap square shaped filter, or a 13-tap diamond shaped filter.
38. The method according to clause 26, further comprising:
determining, based on a flag, whether the directional cross component filter is enabled for a video sequence or a video frame.
39. The method according to clause 38, further comprising:
determining the directional cross component filter is enabled, if the flag is signaled in the encoded bit stream and has a first value;
determining the directional cross component filter is disabled, if the flag is signaled in the encoded bit stream and has a second value; and
determining the directional cross component filter is disabled, if the flag is not signaled in the encoded bit stream.
40. The method according to clause 38, wherein the flag is signaled in a video sequence header or a video frame header.
41. The method according to clause 40, wherein the flag is signaled in a video frame header if:
a constraint directional enhancement filter is enabled for a video sequence associated with the video frame header, and
the video sequence comprises a chroma component.
42. The method according to clause 26, wherein decoding the encoded bit stream to determine the plurality of filter coefficients associated with the directional cross component filter comprises:
retrieving, based on an index signaled in the encoded bit stream, the set of filter coefficients from a buffer.
43. The method according to clause 42, further comprising:
updating the buffer to include one or more sets of filter coefficients associated with the directional cross component filter.
44. The method according to clause 43, wherein the direction of the reconstructed luma block is one of a plurality of directions, and a plurality of buffers are used for storing filter coefficients for performing directional cross component filtering on the plurality of directions, respectively.
45. The method according to clause 43, further comprising:
in response to a flag signaled in the encoded bit stream, initiating the buffer.
46. The method according to clause 45, wherein initiating the buffer comprises:
emptying the buffer, or
setting filter coefficients stored in the buffer to predetermined values.
47. A video encoding apparatus, comprising:
a memory figured to store instructions; and
one or more processors configured to execute the instructions to cause the apparatus to perform:
determining, for a reconstructed chroma block, an offset to a direction of a reconstructed luma block associated with the reconstructed chroma block, and
adding the offset to the reconstructed chroma block,
wherein the determining of the offset comprises applying a directional cross component filter to the reconstructed luma block.
48. A non-transitory computer readable medium that stores a set of instructions that is executable by one or more processors of an apparatus to cause the apparatus to perform a video encoding method, the method comprising:
determining, for a reconstructed chroma block, an offset to a direction of a reconstructed luma block associated with the reconstructed chroma block, and
adding the offset to the reconstructed chroma block,
wherein the determining of the offset comprises applying a directional cross component filter to the reconstructed luma block.
49. A video decoding apparatus, comprising:
a memory figured to store instructions; and
one or more processors configured to execute the instructions to cause the apparatus to perform:
determining a direction of a reconstructed luma block;
decoding an encoded bit stream to determine a plurality of filter coefficients associated with a directional cross component filter; and
applying the plurality of filter coefficients to the reconstructed luma block to determine an offset to the direction of the reconstructed luma block.
50. A non-transitory computer readable medium that stores a set of instructions that is executable by one or more processors of an apparatus to cause the apparatus to perform a video decoding method, the method comprising:
determining a direction of a reconstructed luma block;
decoding an encoded bit stream to determine a plurality of filter coefficients associated with a directional cross component filter; and
applying the plurality of filter coefficients to the reconstructed luma block to determine an offset to the direction of the reconstructed luma block.
51. A non-transitory computer readable medium storing a data stream, wherein the data stream comprises:
decoded syntax elements indicating a set of coefficients used in a directional cross component filter,
wherein applying the directional cross component filter and the set of coefficients to a reconstructed luma block generates an offset for a reconstructed chroma block associated with the reconstructed luma block, the offset being added to the reconstructed chroma block during a loop filtering process of the reconstructed chroma block.

52. The non-transitory computer readable medium according to clause 51, wherein the directional cross component filter comprises one or more of a 9-tap cross shaped filter, a 9-tap square shaped filter, or a 13-tap diamond shaped filter.
53. The non-transitory computer readable medium according to clause 51, wherein the decoded syntax elements comprise a flag indicating whether the directional cross component filter is enabled for a video sequence or a video frame.
54. The non-transitory computer readable medium according to clause 51, wherein the set of coefficients is stored in a buffer, and the decoded syntax elements comprise an index pointing to the set of coefficients stored in the buffer.
55. The non-transitory computer readable medium according to clause 54, wherein the decoded syntax elements comprise a flag associated with a chroma component of a video frame, the flag indicating whether directional cross component filtering associated with the chroma component uses coefficients stored in the buffer.
56. The non-transitory computer readable medium according to clause 55, wherein the chroma component is a Cb component or a Cr component.
57. The non-transitory computer readable medium according to clause 51, wherein each coefficient in the set of coefficients comprises an absolute value and a sign, and the decoded syntax elements comprise a separate indicator for each of the absolute values and signs.
58. The non-transitory computer readable medium according to clause 51, wherein the direction of the reconstructed luma block is one of a plurality of directions, and the decoded syntax elements comprise a first flag indicating whether the directional cross component filter is enabled for a first direction.
59. The non-transitory computer readable medium according to clause 58, wherein the decoded syntax elements comprise a second flag indicating whether directional cross component filtering associated with the first direction uses coefficients stored in a buffer.
60. The non-transitory computer readable medium according to clause 51, wherein the set of coefficients is stored in a buffer, and the decoded syntax elements comprise a flag for initiating the buffer.
61. The non-transitory computer readable medium according to clause 60, wherein initiating the buffer comprises:
emptying the buffer, or
setting coefficients stored in the buffer to predetermined values.
62. The non-transitory computer readable medium according to clause 51, wherein performing directional filtering of the reconstructed chroma block comprises applying the offset to the reconstructed chroma block at a strength level, and the decoded syntax elements comprise:
indicators of one or more strength levels allowed for a chroma component of a video frame, and
a flag indicating a quantity of the one or more strength levels.
63. The non-transitory computer readable medium according to clause 62, wherein the indicators of the one or more strength levels comprise an index pointing to a strength level in a set of predetermined strength levels.
64. The non-transitory computer readable medium according to clause 62, wherein the decoded syntax elements further comprise an index pointing to one of the one or more strength levels, the index being associated with a block of the video frame.

In some embodiments, a non-transitory computer-readable storage medium is also provided. In some embodiments, the medium can store all or portions of the video bit stream having encoded syntax elements indicating a set of coefficients used in a directional cross component filter. The directional cross component filter and the set of coefficients can be applied by, for example, a video decoder, to a reconstructed luma block to generate an offset to a direction of the reconstructed luma block. The decoder can perform, based on the offset, directional filtering of a reconstructed chroma block associated with the reconstructed luma block. The reconstructed chroma block may a collocated chroma block of the reconstructed luma block.

In some embodiments, the non-transitory computer-readable storage medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video decoding method, comprising:

receiving a reconstructed luma block and a first reconstructed chroma block, the reconstructed luma block and the first reconstructed chroma block forming an input to a constraint directional enhancement filter;

determining a direction of the reconstructed luma block;

applying the constraint directional enhancement filter to determine a second reconstructed chroma block based on the first reconstructed chroma block and the direction of the reconstructed luma block;

decoding an encoded bit stream to determine a plurality of filter coefficients associated with a directional cross component filter with a cross shape;

determining an offset by applying the cross-shape directional cross component filter to samples of the reconstructed luma block that are along the determined direction;

adding the offset to the second reconstructed chroma block; and generating a reconstructed video frame based on the second reconstructed chroma block.

2. The method according to claim 1, wherein adding the offset to the second reconstructed chroma block comprises:

decoding the encoded bit stream to determine a strength level associated with the offset; and adding the offset to the second reconstructed chroma block at the strength level.

3. The method according to claim 2, wherein the strength level is an integer greater than or equal to zero.

4. The method according to claim 2, wherein an index is signaled in coding parameters to indicate a strength level associated with a filter block.

5. The method according to claim 4, wherein the filter block is a 64×64 block.

6. The method according to claim 1, further comprising:

determining, based on a flag, whether the directional cross component filter is enabled for a video sequence or a video frame.

7. The method according to claim 6, further comprising:

determining the directional cross component filter is enabled, if the flag is signaled in the encoded bit stream and has a first value;

determining the directional cross component filter is disabled, if the flag is signaled in the encoded bit stream and has a second value; and determining the directional cross component filter is disabled, if the flag is not signaled in the encoded bit stream.

8. The method according to claim 6, wherein the flag is signaled in a video sequence header or a video frame header.

9. The method according to claim 8, wherein the flag is signaled in a video frame header if:

a constraint directional enhancement filter is enabled for a video sequence associated with the video frame header, and the video sequence comprises a chroma component.

10. The method according to claim 1, wherein the cross-shape directional cross component filter is an 8-tap filter.

11. A video decoding apparatus, comprising:

a memory figured to store instructions; and one or more processors configured to execute the instructions to cause the apparatus to perform:

receiving a reconstructed luma block and a first reconstructed chroma block, the reconstructed luma block and the first reconstructed chroma block forming an input to a constraint directional enhancement filter;

determining a direction of the reconstructed luma block;

applying the constraint directional enhancement filter to determine a second reconstructed chroma block based on the first reconstructed chroma block and the direction of the reconstructed luma block;

decoding an encoded bit stream to determine a plurality of filter coefficients associated with a directional cross component filter with a cross shape;

determining an offset by applying the cross-shape directional cross component filter to samples of the reconstructed luma block that are along the determined direction;

adding the offset to the second reconstructed chroma block; and generating a reconstructed video frame based on the second reconstructed chroma block.

12. The video decoding apparatus according to claim 11, wherein adding the offset to the second reconstructed chroma block comprises:

decoding the encoded bit stream to determine a strength level associated with the offset; and adding the offset to the second reconstructed chroma block at the strength level.

13. The video decoding apparatus according to claim 12, wherein the strength level is an integer greater than or equal to zero.

14. The video decoding apparatus according to claim 12, wherein an index is signaled in coding parameters to indicate a strength level associated with a filter block.

15. The video decoding apparatus according to claim 14, wherein the filter block is a 64×64 block.

16. The video decoding apparatus according to claim 11, wherein the one or more processors are configured to execute the instructions to cause the apparatus to perform:

determining, based on a flag, whether the directional cross component filter is enabled for a video sequence or a video frame.

17. The video decoding apparatus according to claim 16, wherein the one or more processors are configured to execute the instructions to cause the apparatus to perform:

determining the directional cross component filter is enabled, if the flag is signaled in the encoded bit stream and has a first value;

determining the directional cross component filter is disabled, if the flag is signaled in the encoded bit stream and has a second value; and determining the directional cross component filter is disabled, if the flag is not signaled in the encoded bit stream.

18. The video decoding apparatus according to claim 16, wherein the flag is signaled in a video sequence header or a video frame header.

19. The video decoding apparatus according to claim 18, wherein the flag is signaled in a video frame header if:

a constraint directional enhancement filter is enabled for a video sequence associated with the video frame header, and the video sequence comprises a chroma component.

20. The video decoding apparatus according to claim 11, wherein the cross-shape directional cross component filter is an 8-tap filter.

21. A method of storing a bitstream of a video, the method comprising:

receiving a reconstructed luma block and a first reconstructed chroma block, the reconstructed luma block and the first reconstructed chroma block forming an input to a constraint directional enhancement filter;

determining a direction of the reconstructed luma block;

applying the constraint directional enhancement filter to determine a second reconstructed chroma block based on the first reconstructed chroma block and the direction of the reconstructed luma block;

determining a plurality of filter coefficients associated with a directional cross component filter with a cross shape;

determining an offset by applying the cross-shape directional cross component filter to samples of the reconstructed luma block that are along the determined direction;

adding the offset to the second reconstructed chroma block;

generating a reconstructed video frame based on the second reconstructed chroma block;

generating a bitstream comprising coded information signaling the plurality of filter coefficients; and storing the bitstream in a non-transitory computer readable medium.

22. The method according to claim 21, wherein the cross-shape directional cross component filter is an 8-tap filter.

* * * * *